US012454378B2

(12) United States Patent
Dinka et al.

(10) Patent No.: US 12,454,378 B2
(45) Date of Patent: Oct. 28, 2025

(54) PACKAGING SYSTEM FOR SMALL-VOLUME ASEPTIC FILLING

(71) Applicant: West Pharmaceutical Services, Inc., Exton, PA (US)

(72) Inventors: John Dinka, Doylestown, PA (US); Eric Claude, Vienna, VA (US); Robert A. Carlton, Lowell, MA (US); Lynessa Erler, Burke, VA (US); Kathleen McHugh, Alexandria, VA (US); Maria Pascale, Washington, DC (US)

(73) Assignee: West Pharmaceutical Services, Inc., Exton, PA (US)

( * ) Notice: Subject to any disclaimer, the term of this patent is extended or adjusted under 35 U.S.C. 154(b) by 0 days.

(21) Appl. No.: 18/200,040

(22) Filed: May 22, 2023

(65) Prior Publication Data

US 2023/0286683 A1 Sep. 14, 2023

Related U.S. Application Data

(62) Division of application No. 17/332,024, filed on May 27, 2021, now Pat. No. 11,679,902, which is a (Continued)

(51) Int. Cl.
*B65B 7/28* (2006.01)
*B65D 71/50* (2006.01)
(Continued)

(52) U.S. Cl.
CPC ............ *B65B 7/2821* (2013.01); *B65D 71/50* (2013.01); *B67B 1/04* (2013.01); *B65B 3/003* (2013.01)

(58) Field of Classification Search
CPC ..... B65B 7/2821; B65B 7/161; B65B 31/027; B67B 1/04; B67B 1/045; B67B 3/2006;
(Continued)

(56) References Cited

U.S. PATENT DOCUMENTS 1,155,119 A 9/1915 Winter
2,484,043 A * 10/1949 Malen ..................... B67B 7/162 29/246
(Continued)

FOREIGN PATENT DOCUMENTS

CN 1125682 A 7/1996
CN 1541121 A 10/2004
(Continued)

OTHER PUBLICATIONS

"Ming cap bottle uncovers the press cover tool—A review of contributions"; Pharmacy Notification; China Academic Journal; Jun. 1996, p. 270-272 (contains English Abstract).
(Continued)

*Primary Examiner* — Joshua G Kotis
(74) *Attorney, Agent, or Firm* — Blank Rome LLP

(57) ABSTRACT

A packaging system for sealing a medicine container having a filling opening with a stopper includes a container tray having a container cell for receiving and stabilizing the medicine container. A shuttle has an exterior surface and an interior surface. The interior surface is configured for releasably securing the stopper. The shuttle is configured to release the stopper into the fill opening upon application of a releasing force to the exterior surface of the shuttle. A shuttle tray has a shuttle cell. The shuttle cell forms a body with a proximal opening, an interior space, a bottom inner surface opposite the proximal opening, and a side inner surface. The shuttle cell releasably secures the shuttle.

19 Claims, 36 Drawing Sheets

Related U.S. Application Data division of application No. 16/955,427, filed as application No. PCT/US2018/067450 on Dec. 24, 2018, now Pat. No. 11,161,633.

(60) Provisional application No. 62/712,635, filed on Jul. 31, 2018, provisional application No. 62/609,758, filed on Dec. 22, 2017.

(51) Int. Cl.
*B67B 1/04* (2006.01)
*B65B 3/00* (2006.01)

(58) Field of Classification Search
CPC ........ B67B 2201/012; B67B 2201/015; B67B 7/02; B67B 7/162; B67B 7/164; G01N 2035/0405; B25J 15/12
USPC ............................ 422/568, 569; 53/478, 287
See application file for complete search history.

(56) References Cited

U.S. PATENT DOCUMENTS

| | | | | | |
|---|---|---|---|---|---|
| 2,616,600 | A | | 11/1952 | Morgan | |
| 2,849,848 | A | | 9/1958 | Ravn | |
| 2,998,686 | A | | 9/1961 | Pirro | |
| 3,071,274 | A | | 1/1963 | Ravn | |
| 3,175,695 | A | | 3/1965 | Goodman | |
| 3,208,617 | A | | 9/1965 | Baron | |
| 3,339,772 | A | | 9/1967 | Miller | |
| 3,649,462 | A | | 3/1972 | Jessup | |
| 4,060,457 | A | | 11/1977 | Iizuka | |
| 4,098,053 | A | * | 7/1978 | Shank | B65B 7/2821 53/367 |
| 4,164,964 | A | | 8/1979 | Daniels | |
| 4,230,231 | A | | 10/1980 | Burnett | |
| 4,374,464 | A | | 2/1983 | Tillander | |
| 4,442,735 | A | * | 4/1984 | Chance | B67B 7/066 81/3.36 |
| 4,798,106 | A | | 1/1989 | Foster | |
| 4,844,267 | A | | 7/1989 | Von Schuckmann | |
| 5,005,721 | A | | 4/1991 | Jordan | |
| 5,047,210 | A | | 9/1991 | Melet | |
| 5,085,332 | A | | 2/1992 | Gettig | |
| 5,112,574 | A | | 5/1992 | Horton | |
| 5,185,985 | A | | 2/1993 | Vetter | |
| 5,275,070 | A | * | 1/1994 | St. Denis | B67B 7/066 81/3.44 |
| 5,379,908 | A | | 1/1995 | Rohe | |
| 5,425,446 | A | | 6/1995 | Weaver | |
| 5,479,969 | A | * | 1/1996 | Hardie | B65B 3/003 422/549 |
| 5,490,321 | A | * | 2/1996 | Kaneko | B23P 19/04 29/709 |
| 5,494,087 | A | | 2/1996 | Pitelka | |
| 5,519,984 | A | | 5/1996 | Beussink | |
| 5,525,298 | A | * | 6/1996 | Anami | G01N 35/1079 422/65 |
| 5,655,806 | A | * | 8/1997 | Halladay | B67B 7/02 294/28 |
| D386,215 | S | * | 11/1997 | White | D8/395 |
| 5,685,845 | A | | 11/1997 | Grimard | |
| 5,901,866 | A | | 5/1999 | Storar | |
| 6,106,783 | A | | 8/2000 | Gamble | |
| 6,263,761 | B1 | * | 7/2001 | Ryder | B67B 7/04 7/151 |
| 6,387,078 | B1 | | 5/2002 | Gillespie, III | |
| 6,419,086 | B1 | | 7/2002 | Vecchio | |
| 6,579,217 | B1 | | 6/2003 | Buxton | |
| 6,802,802 | B2 | | 10/2004 | Woog | |
| 6,868,978 | B2 | | 3/2005 | Amschlinger | |
| 6,879,880 | B2 | * | 4/2005 | Nowlin | A61B 34/70 318/568.22 |
| 6,890,488 | B2 | | 5/2005 | Mathus | |
| 7,132,082 | B2 | | 11/2006 | Aviles | |
| 8,196,375 | B2 | | 6/2012 | Kohanski | |
| 8,770,399 | B2 | | 7/2014 | Hjalmarsson | |
| 9,044,549 | B2 | | 6/2015 | Niklasson | |
| 9,914,121 | B2 | | 3/2018 | Lazevski | |
| 10,625,413 | B1 | * | 4/2020 | McPherson | B25J 15/0213 |
| 10,696,431 | B2 | | 6/2020 | Lümkemann | |
| 10,773,838 | B2 | | 9/2020 | Werk | |
| 2002/0010995 | A1 | | 1/2002 | Thibault | |
| 2004/0139698 | A1 | | 7/2004 | Grifols | |
| 2005/0050998 | A1 | | 3/2005 | Reynolds | |
| 2007/0272648 | A1 | | 11/2007 | Hamamoto | |
| 2008/0147090 | A1 | * | 6/2008 | Seibold | A61B 34/71 606/130 |
| 2008/0216312 | A1 | | 9/2008 | Williams et al. | |
| 2009/0026099 | A1 | | 1/2009 | Robinson | |
| 2010/0031760 | A1 | | 2/2010 | Sherman | |
| 2010/0034700 | A1 | | 2/2010 | Rousseau | |
| 2010/0155271 | A1 | | 6/2010 | Hammerl | |
| 2010/0180551 | A1 | * | 7/2010 | Duethorn | B65B 31/027 53/467 |
| 2011/0018186 | A1 | * | 1/2011 | Tsai | G01N 3/04 269/134 |
| 2011/0088517 | A1 | * | 4/2011 | Tsujimura | G01N 35/026 81/3.2 |
| 2011/0192756 | A1 | | 8/2011 | Hill | |
| 2011/0253251 | A1 | | 10/2011 | Mudd | |
| 2011/0319247 | A1 | | 12/2011 | Kitazawa | |
| 2012/0247277 | A1 | * | 10/2012 | Moore | B67B 7/02 81/3.44 |
| 2012/0248057 | A1 | | 10/2012 | Bogle | |
| 2012/0317936 | A1 | * | 12/2012 | Murray | B65B 3/045 53/545 |
| 2013/0174520 | A1 | | 7/2013 | Tessier | |
| 2013/0209210 | A1 | * | 8/2013 | Nuotio | G01N 35/0099 414/800 |
| 2014/0027342 | A1 | | 1/2014 | Pawlowski et al. | |
| 2014/0034545 | A1 | | 2/2014 | Pawlowski | |
| 2014/0158700 | A1 | | 6/2014 | Glocker | |
| 2014/0331618 | A1 | | 11/2014 | Guggisberg | |
| 2014/0363885 | A1 | | 12/2014 | Day | |
| 2015/0132185 | A1 | | 5/2015 | Khamu | |
| 2015/0196999 | A1 | * | 7/2015 | Sampath | B25B 7/02 81/418 |
| 2015/0238263 | A1 | | 8/2015 | Nicoletti | |
| 2016/0200461 | A1 | | 7/2016 | Broadbent | |
| 2016/0272347 | A1 | | 9/2016 | Procyshyn | |
| 2017/0036788 | A1 | | 2/2017 | Py | |
| 2017/0081056 | A1 | | 3/2017 | Zambaux | |
| 2017/0107091 | A1 | * | 4/2017 | Peirsman | B67D 1/0807 |
| 2017/0166366 | A1 | | 6/2017 | Levy Sarraf | |
| 2017/0259948 | A1 | | 9/2017 | Werk | |
| 2019/0060909 | A1 | | 2/2019 | Wardenburg | |
| 2019/0330102 | A1 | | 10/2019 | Weinhold | |
| 2020/0009745 | A1 | * | 1/2020 | Grossard | B25J 11/0045 |
| 2021/0362898 | A1 | | 11/2021 | Sanmartin | |

FOREIGN PATENT DOCUMENTS

| | | | | | |
|---|---|---|---|---|---|
| CN | 1997455 | A | | 7/2007 | |
| CN | 101001782 | A | | 7/2007 | |
| CN | 101400571 | A | | 4/2009 | |
| CN | 102574123 | A | | 7/2012 | |
| CN | 103393539 | A | | 11/2013 | |
| CN | 104192331 | A | | 12/2014 | |
| CN | 104220038 | | | 12/2014 | |
| CN | 104272049 | A | | 1/2015 | |
| CN | 104755115 | A | | 7/2015 | |
| CN | 105050636 | A | | 11/2015 | |
| CN | 107000857 | A | | 8/2017 | |
| CN | 107000858 | A | | 8/2017 | |
| DE | 29518548 | U1 | * | 3/1996 | |
| DE | 29703993 | U1 | | 7/1998 | |
| DE | 102004035061 | A1 | * | 2/2006 | B65B 3/003 |
| DE | 102012025616 | A1 | | 11/2013 | |
| EP | 1053790 | A2 | | 11/2000 | |
| EP | 2191942 | A1 | * | 6/2010 | G01N 35/0099 |
| FR | 2049252 | A5 | | 3/1971 | |

(56) References Cited

FOREIGN PATENT DOCUMENTS

| | | | | | |
|---|---|---|---|---|---|
| FR | 2510514 | A1 | | 2/1983 | |
| FR | 2571349 | A1 | | 4/1986 | |
| JP | 61189457 | A | * | 8/1986 | ............. G01N 35/00 |
| JP | H0858792 | A | | 3/1996 | |
| WO | 9703790 | A1 | | 2/1997 | |
| WO | 2011062891 | A1 | | 5/2011 | |
| WO | 2011103984 | A1 | | 9/2011 | |
| WO | WO-2012056115 | A2 | * | 5/2012 | ............. B25J 15/12 |
| WO | 2014130349 | A1 | | 8/2014 | |
| WO | 2016111698 | A1 | | 7/2016 | |
| WO | 2016166765 | A1 | | 10/2016 | |
| WO | 2016166769 | A1 | | 10/2016 | |
| WO | 2018020505 | A1 | | 2/2018 | |

OTHER PUBLICATIONS

Int'l Search Report and Written Opinion dated Mar. 26, 2019 in Int'l Application No. PCT/US2018/067450.

Office Action issued Apr. 20, 2021 in European Application No. 18837072.0.

Yang Huiying, Zhang Qingsheng, Tang Qiujin, "Some experiences in the registration management of pharmaceutical packaging materials and containers," China Pharmaceutical Affairs, 2006,20(6):329-330.

* cited by examiner

PACKAGING SYSTEM FOR SMALL-VOLUME ASEPTIC FILLING

CROSS REFERENCE TO RELATED APPLICATIONS

This application is a divisional of U.S. patent application Ser. No. 17/332,024, filed May 27, 2021, which is a divisional of U.S. patent application Ser. No. 16/955,427, filed Jun. 18, 2020, and issued as U.S. Pat. No. 11,161,633 on Nov. 2, 2021, which is a section 371 of International Application No. PCT/US18/67450, filed Dec. 24, 2018, and published as International Publication No. WO 2019/126827 A1 on Jun. 27, 2019, which claims the benefit of U.S. Provisional Patent Application Nos. 62/609,758, filed Dec. 22, 2017, and 62/712,635, filed Jul. 31, 2018. The contents of the referenced applications are hereby incorporated by reference in their entirety.

BACKGROUND

This application relates to the field of filling of medicine containers, and more particularly to small-volume, aseptic filling of medicine containers. Small-volume, aseptic medicine filling containers are increasingly needed due in part to a rise in biologic drugs and personalized medicine which are typically made in small volume batches. In this context, the drug-filling application commonly requires a system with a high level of component quality, but adapted for use at a relatively small scale, with a relatively small number of medicine containers being filled in a particular batch, while maintaining sterility.

In a small-volume drug-filling operation, one option is for the operator to handle, fill, and stopper medicine containers such as medicine vials individually. Another option is for the operator to engage in an "assisted hand fill operation" in which medicine containers are filled in small batches with the assistance of fixtures, tools, or other elements that increase the efficiency and ease of the operation as compared to repeating an individual filling operation. The devices and systems disclosed herein may be advantageously used in an assisted-hand fill operation.

SUMMARY OF THE DISCLOSURE

Briefly stated, a packaging system is disclosed for filling and sealing with a stopper at least one medicine container having a fill opening. The packaging system comprises a container tray having a container cell for receiving and stabilizing the medicine container. A stopper holder with a stopper cell forms a closed body with a distal opening, an interior space, a proximal wall opposite the distal opening, and a proximal outer surface. The stopper cell is configured for releasably securing the stopper. The stopper cell is adapted to release the stopper into the fill opening of the medicine container when a compressive force is exerted on the proximal outer surface of the stopper cell.

Another packaging system is provided for filling and sealing with a stopper at least one medicine container having a fill opening. The packaging system comprises a container tray having a container cell for receiving and stabilizing the medicine container. The packaging system also comprises a shuttle having an exterior surface and an interior surface. The interior surface is configured for releasably securing the stopper. The shuttle is configured to release the stopper into the fill opening upon application of a releasing force to the exterior surface of the shuttle. A shuttle tray has a shuttle cell, and the shuttle cell forms a closed body with a proximal opening, an interior space, a bottom inner surface opposite the proximal opening, and a side inner surface. The shuttle cell releasably secures the shuttle.

Another packaging system is provided for filling and sealing with a stopper at least one medicine container having a fill opening. The packaging system comprises a container tray having a container cell for receiving and stabilizing the medicine container. The packaging system also comprises a stopper clip with a stopper cell. The stopper cell comprising a hinged base having first and second hinged-base legs. The first hinged-base leg has a first proximal hinged-base-leg end and a first distal hinged-base-leg end. The second hinged-base leg has a second proximal hinged-base-leg end and a second distal hinged-base-leg end. The first and second proximal hinged-base-leg ends are joined to each other by a hinge. The hinge is biased to urge the first and second distal hinged-base-leg ends toward one another to a first position. The first hinged-base leg has a first lever extending proximally therefrom, and the second hinged-base leg has a second lever extending proximally therefrom. The first lever has a first interior lever surface facing the second lever and a first exterior lever surface facing opposite the first interior lever surface. The second lever has a second interior lever surface facing the first lever and a second exterior lever surface facing opposite the second interior lever surface. The first lever and the second lever are in spaced relation such that, upon the application of a first compressive force to the first exterior lever surface and the second exterior lever surface, the first base leg and the second base leg are urged to a second position, with the first and second hinged-base legs being spaced apart to allow insertion of the stopper between the first and second hinged-base legs to be releasably secured therebetween. Upon removal of the first compressive force, the first and second hinged-base legs are urged to a third position to releasably secure the stopper therebetween.

A system for handling stoppers for medication containers is claimed which comprises a plurality of stoppers. A handling tray is also claimed which comprises a base with a plurality of stopper rests disposed upon the base for releasably securing the plurality of stoppers to the base. The stopper rests are arranged such that the stoppers are in spaced relation to one another. A cover is releasably and sealingly connected to the base for covering the stopper.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION

Figure 17:
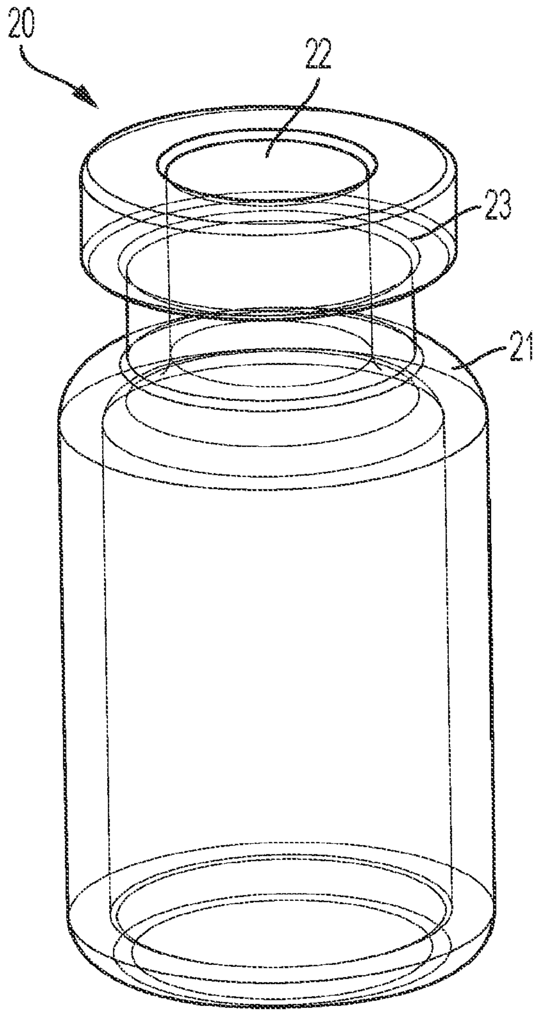
FIG. 17 is a perspective view of an exemplary vial for use in packaging systems disclosed herein.
Figure 18:
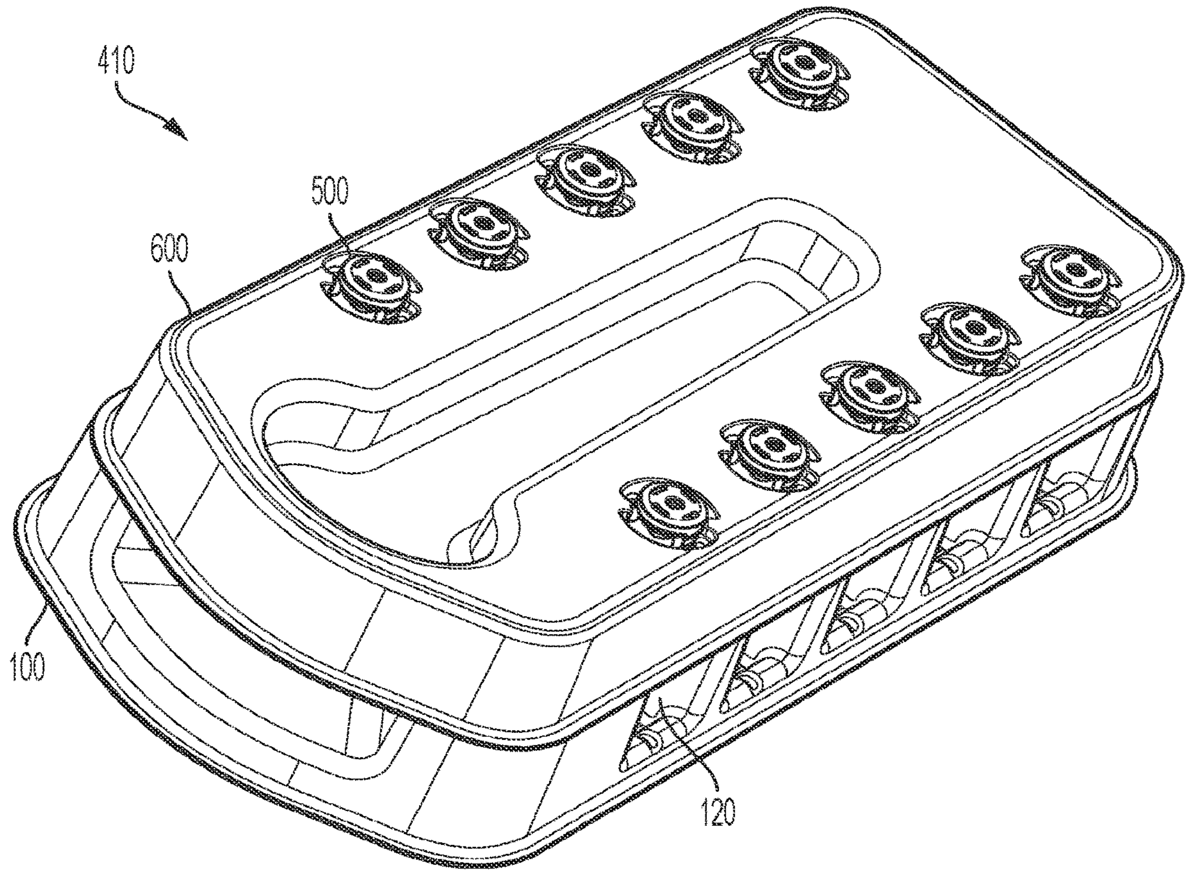
FIG. 18 is a top front right perspective view of a second embodiment of a packaging system according to the invention.
Figure 19:
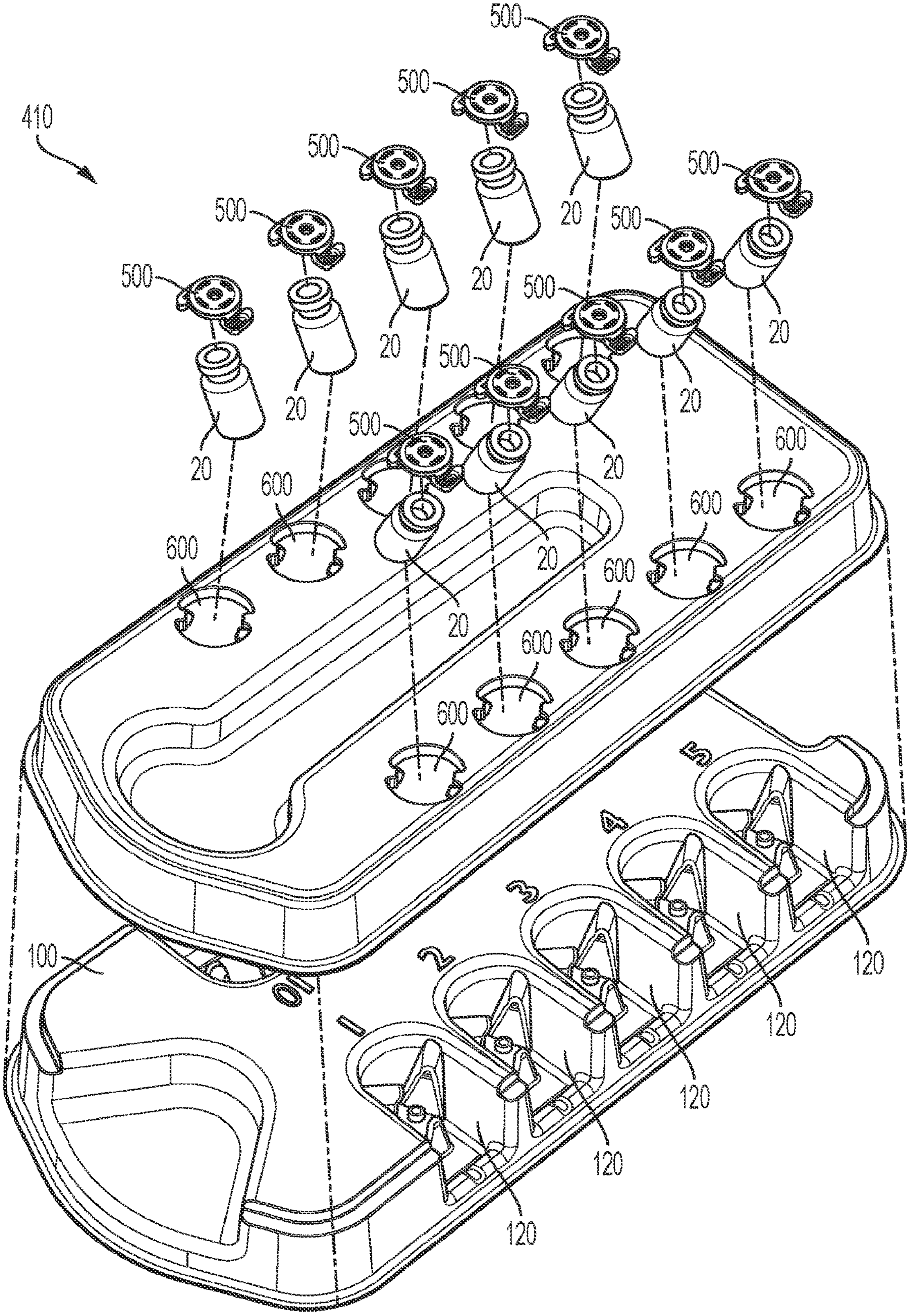
FIG. 19 is a top front right partially exploded view of the packaging system of FIG. 18.

Referring to FIGS. 1-17, a first embodiment of a packaging system 10 includes a medicine container, which is in the illustrated embodiments is a conventional drug vial 20 (see FIG. 17) having a fill opening 22 and a vial flange 23. The packaging system also includes a stopper 200 (FIGS. 13-16) for sealing the fill opening of the vial 20. The example of a stopper 200 shown herein has a major portion 202 with a major diameter 204, and a minor portion 206 with a minor diameter 208. The minor portion 206 has a bore 210 and a tapered lower-end portion 212. Many varieties of stoppers are compatible with the vial 20 and the packaging system 10, including but not limited to a stopper lacking well-defined major and minor portions of stopper 200 as illustrated herein. As described in more detail hereinafter, the packaging system 10 preferably comprises a second vial 20 and a second stopper 200 and more preferably a plurality of vials 20 and a plurality of stoppers 200 for sealing the plurality of vials 20.

Figure 2:
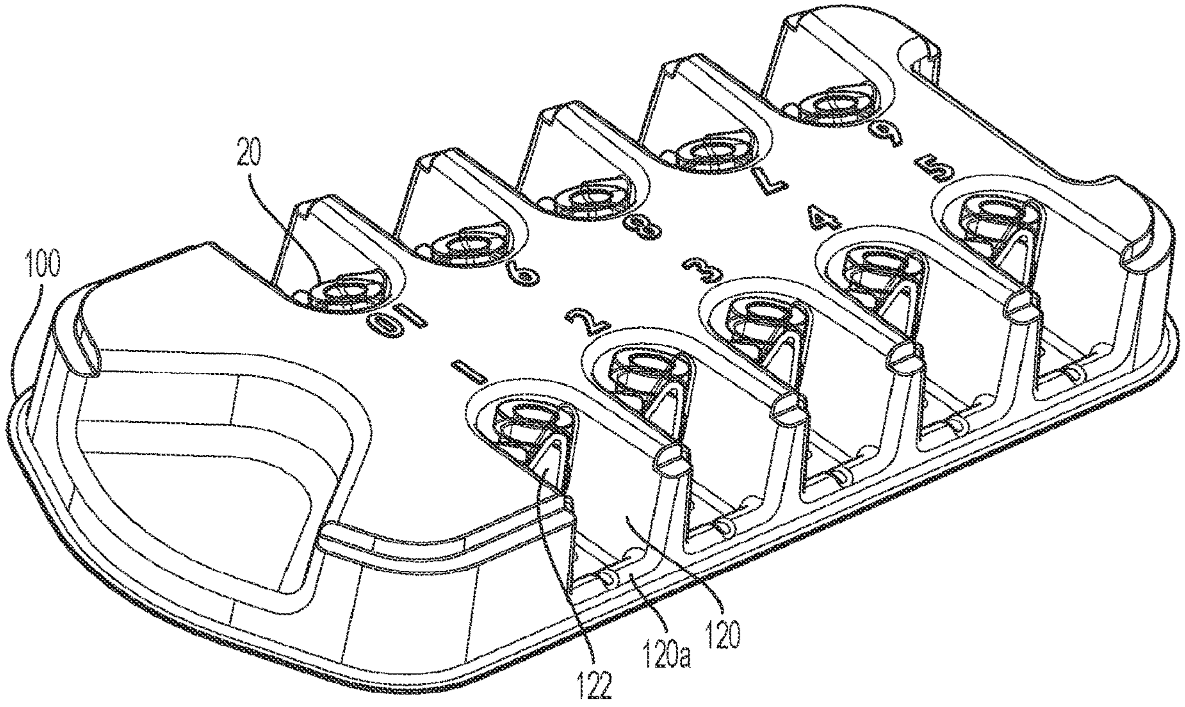
FIG. 2 is a top rear left perspective view of a container tray for use in packaging systems disclosed herein.
Figure 3:
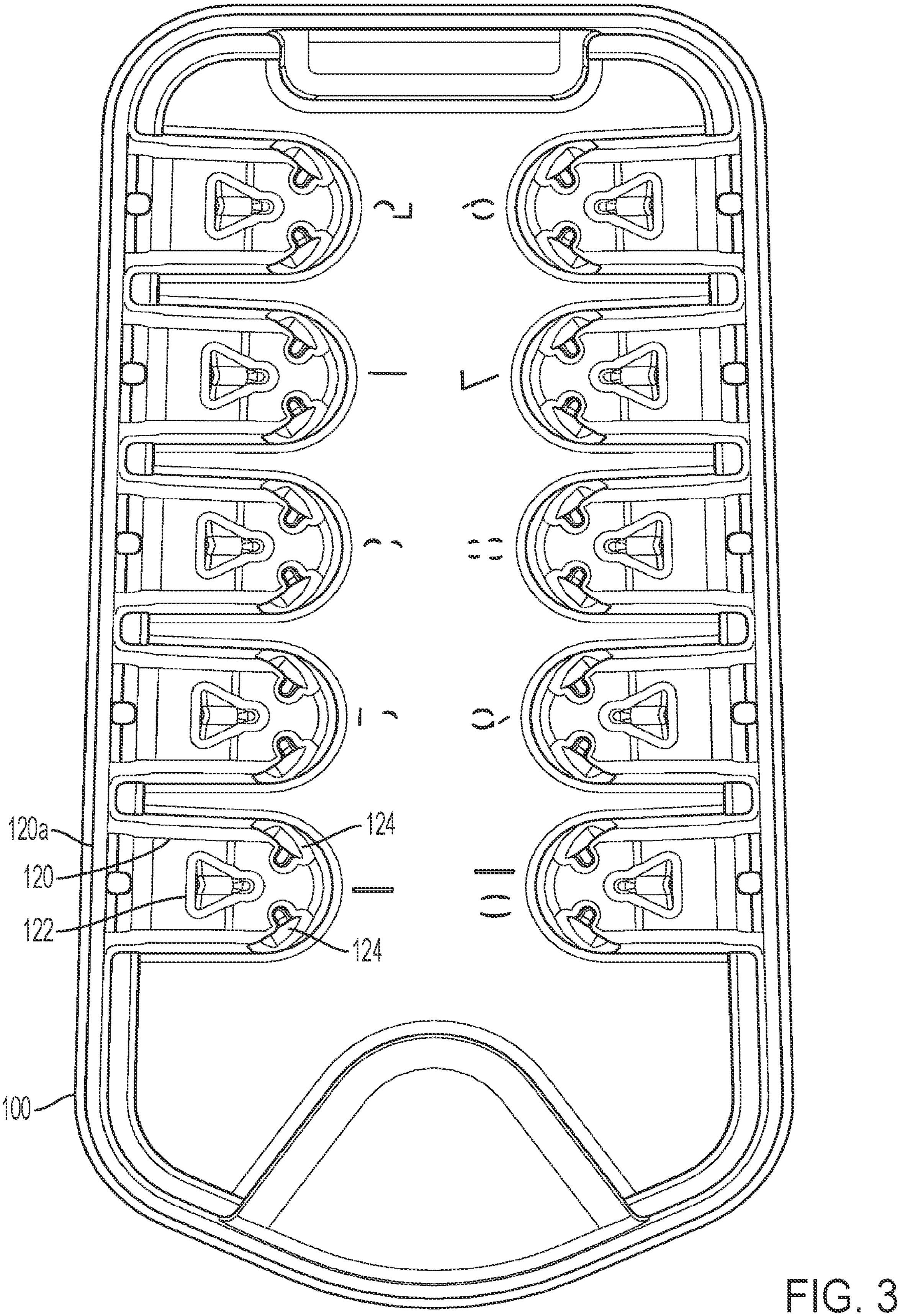
FIG. 3 is a top plan view of the container tray of FIG. 2.
Figure 9:
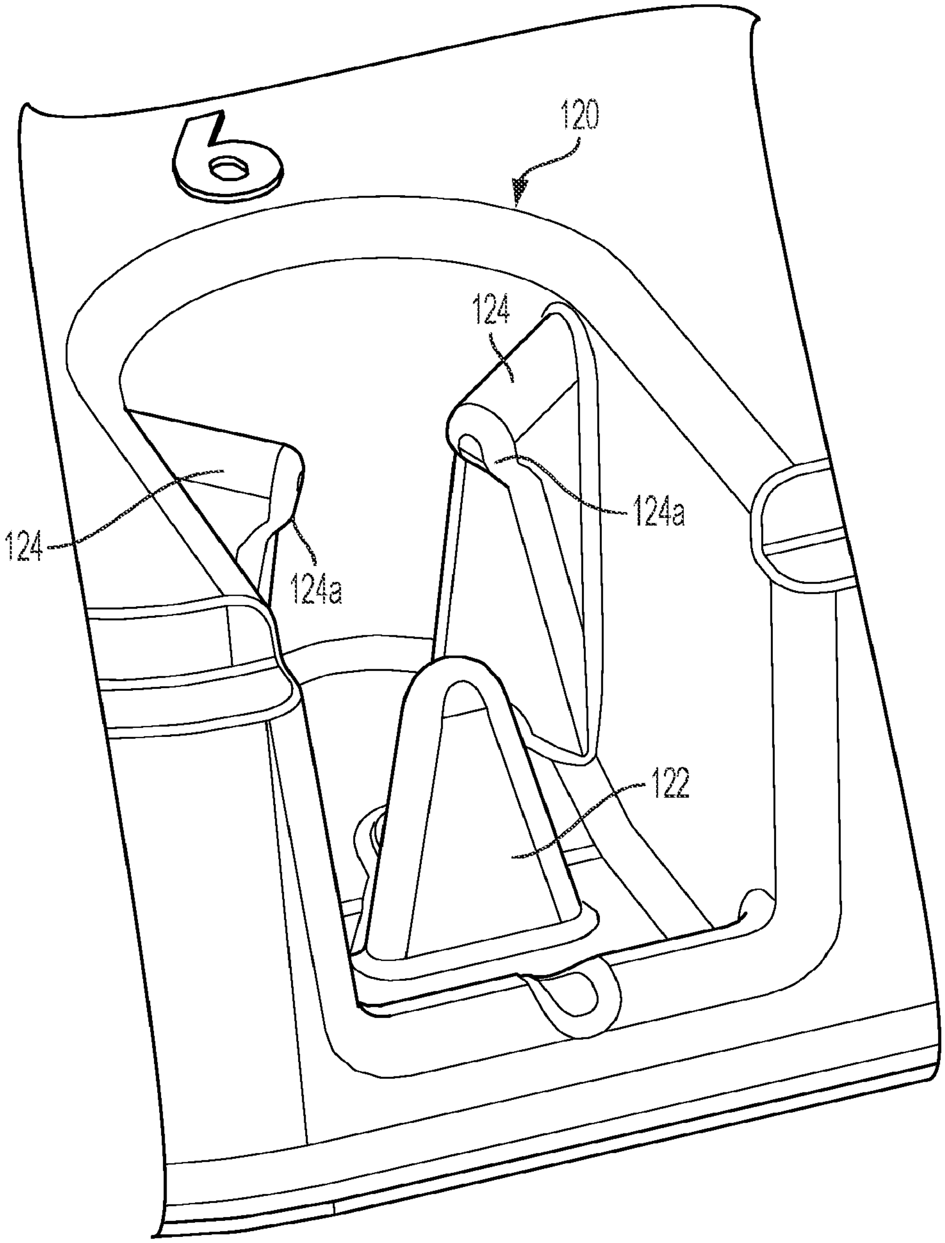
FIG. 9 is an enlarged partial perspective view of a container cell from the container tray of FIG. 2.
Figure 10:
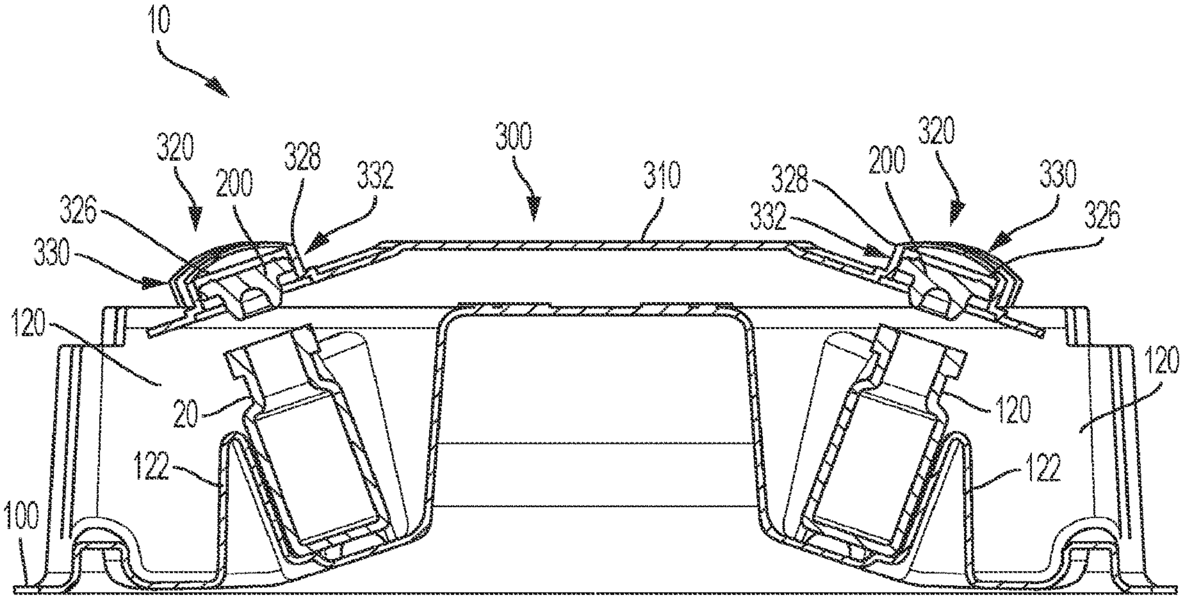
FIG. 10 is a sectional view of the packaging system of FIG. 1, taken along the line 10-10 in FIG. 1.

A container tray 100 preferably includes a plurality of container cells 120 for receiving and stabilizing a corresponding plurality of the vials 20. The container tray 100 is preferably constructed of molded polymeric material with the container cells 120 formed therein by the molding process, as best shown in FIGS. 2 and 3. The container tray 100 may aid a user in an assisted-hand-filling operation by stably holding the vials 20 so that the user may conveniently insert a stopper 200 into the opening 22 of each vial 20. As best shown in FIG. 9, each container cell 120 includes a snap mechanism formed by two sidewall flexible legs 124 and a flexible latch 122 attached to the container cell 120 for releasably securing the vial 20 in the container cell 120. Each container cell 120 is generally in the form of a truncated trough with an open end 120*a*. Each of the two side wall legs 124 includes a chamfered latch 124*a* at a top end thereof extending radially inwardly with respect to the container cell 120. The latch 122 is positioned just inwardly of the open end 120*a*. The side wall legs 124 and latch 122 are positioned triangularly to releasably, slidably, and securely receive the vial 20. The chamfered latch 124*a* extends over a shoulder 21 of the vial 20 in a snap-fit manner when the vial 20 is positioned in the container cell 120.

Figure 1:
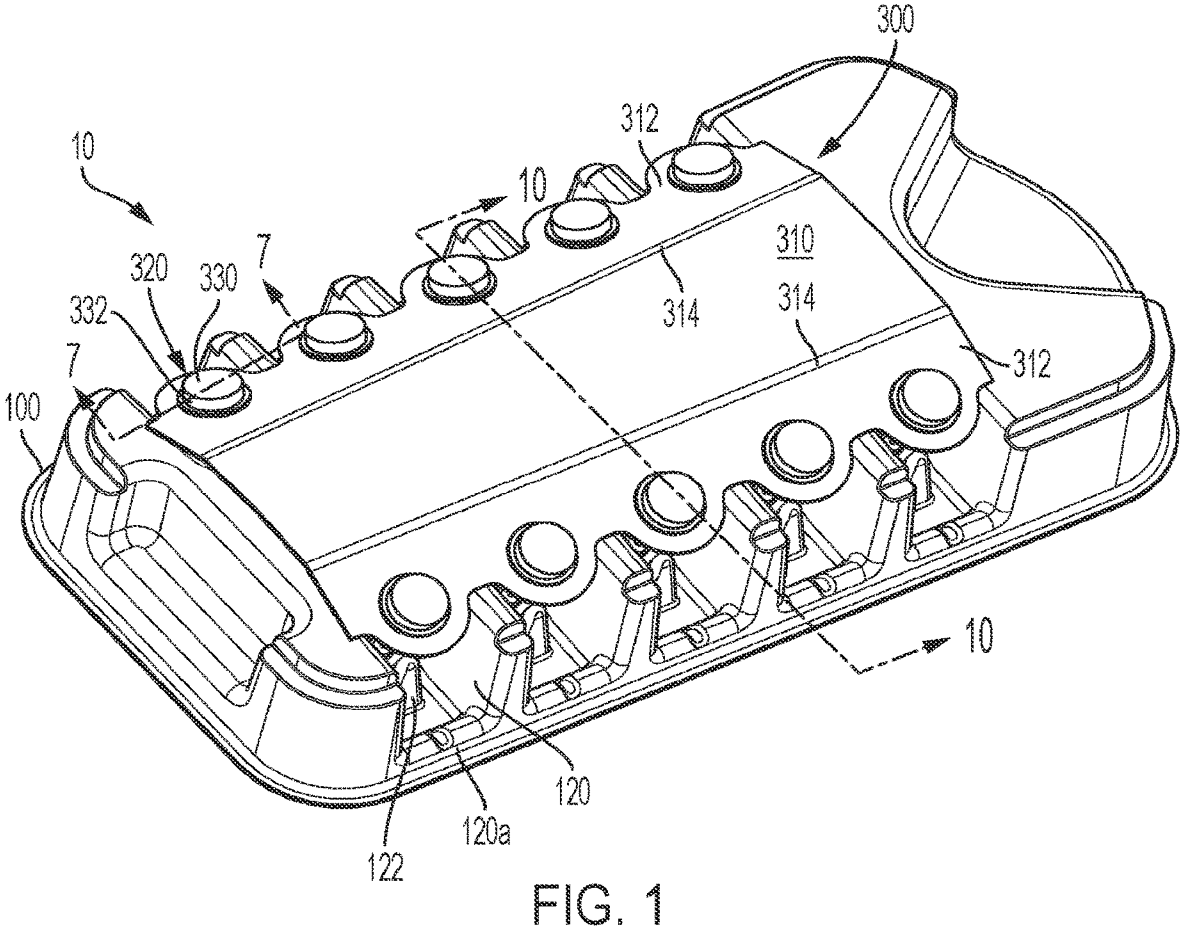
FIG. 1 is a top front right partial perspective view of a first embodiment of a packaging system according to the invention, with the medicine containers omitted.
Figure 4:
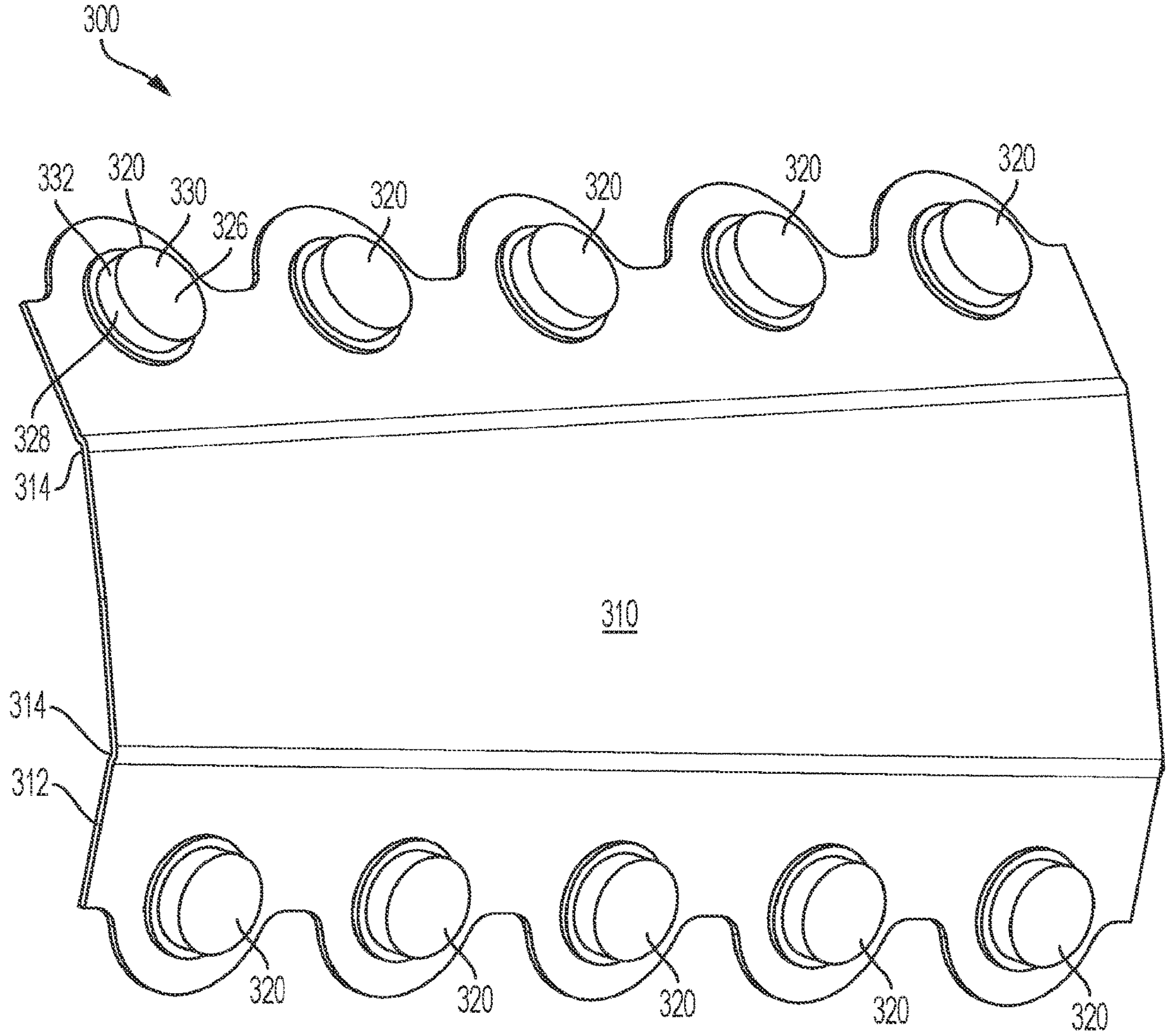
FIG. 4 is front upper perspective view of a stopper holder for use in the system of FIG. 1.
Figure 5:
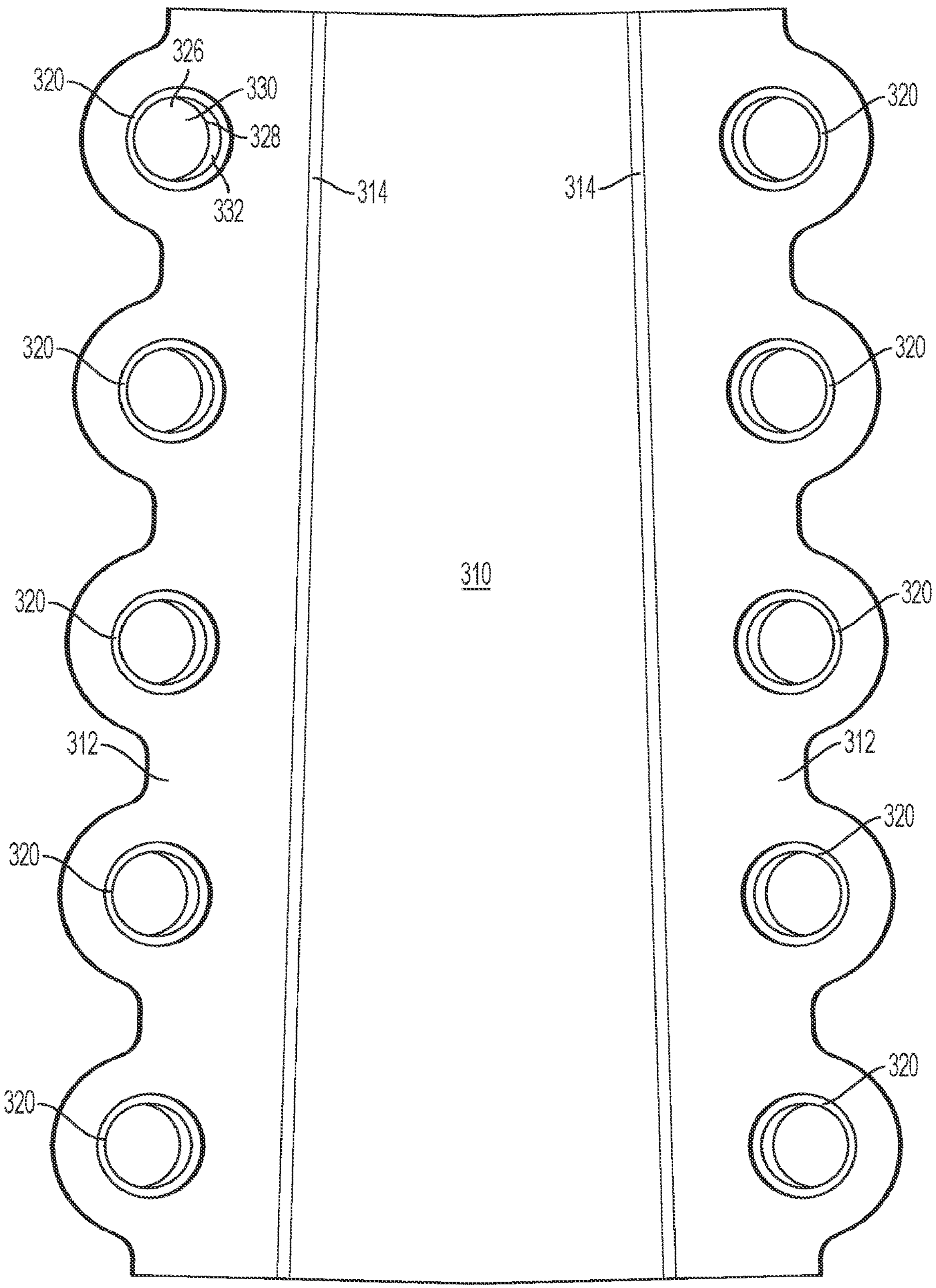
FIG. 5 is a top plan view of the stopper holder of FIG. 4.
Figure 6:
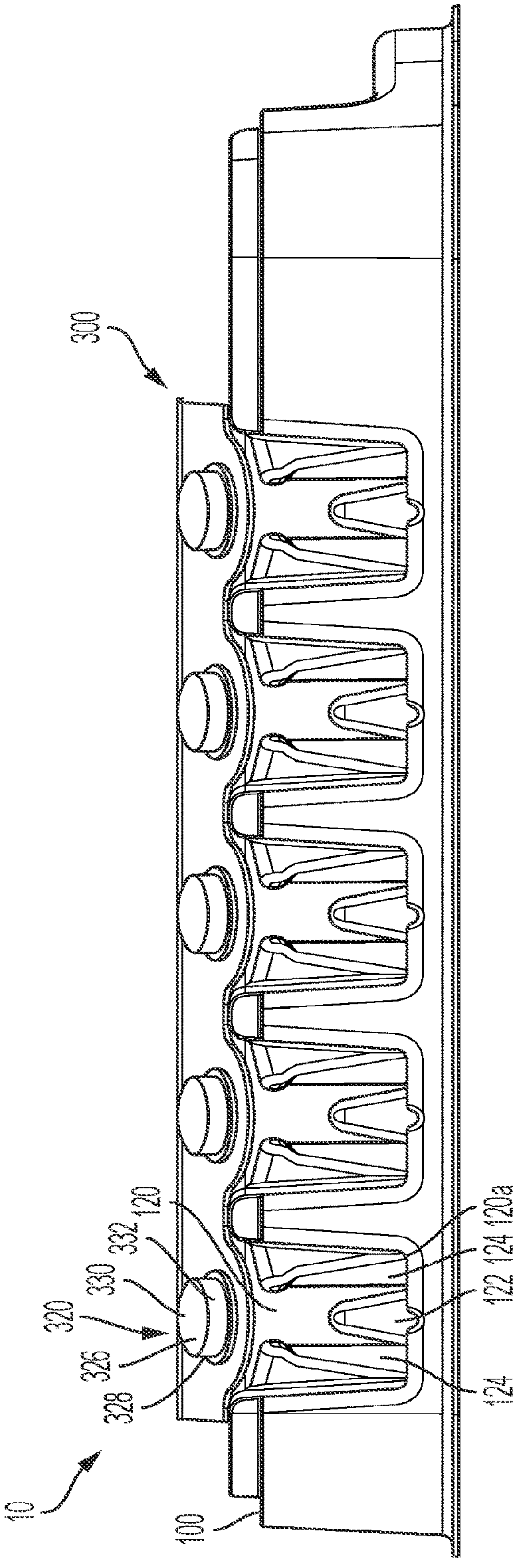
FIG. 6 is a right side elevational view of the container tray of FIG. 2.
Figure 7:
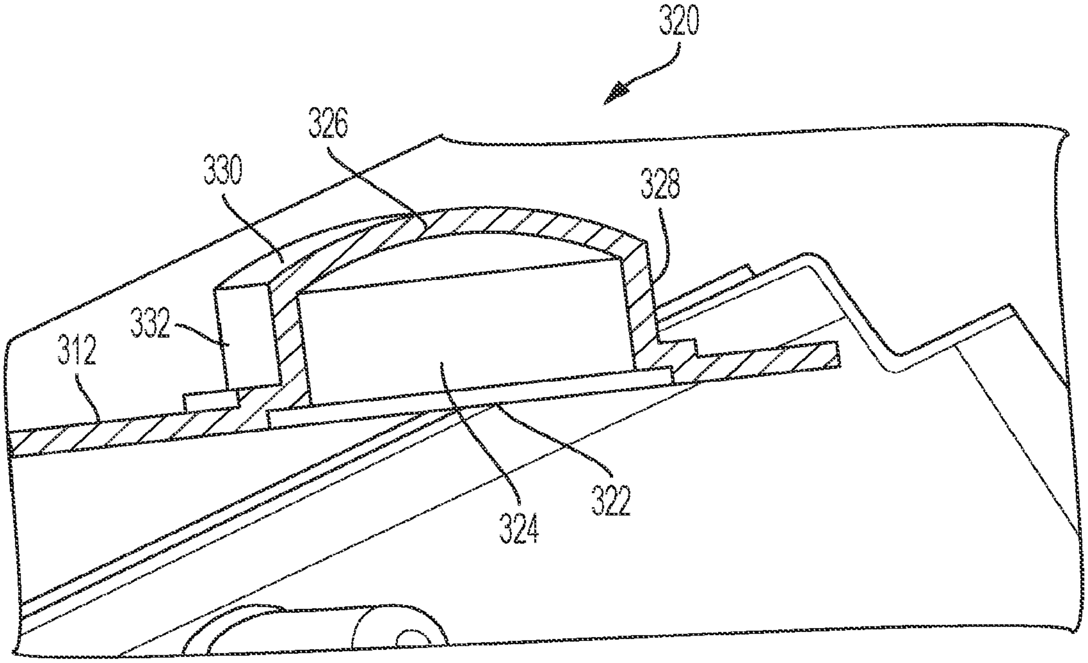
FIG. 7 is an enlarged fragmentary sectional view of the stopper holder of FIG. 1, with a stopper secured therein, taken along line 7-7 of FIG. 1.
Figure 8:
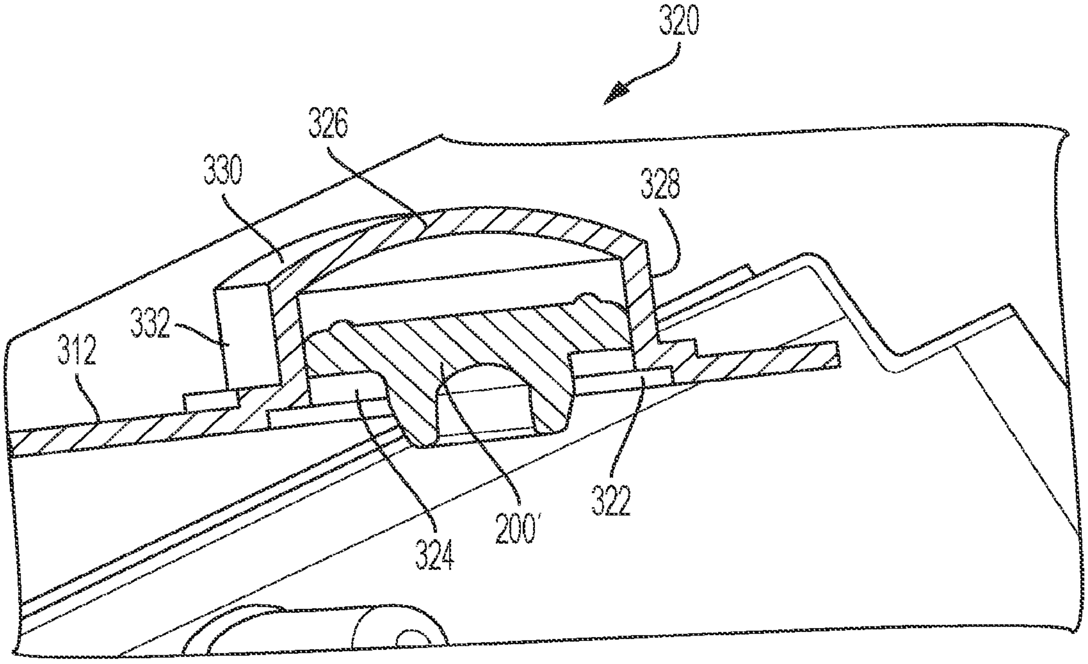
FIG. 8 is a greatly enlarged fragmentary sectional view of the stopper holder of FIG. 7, without a stopper secured therein, taken along line 7-7 of FIG. 1.
Figure 36:
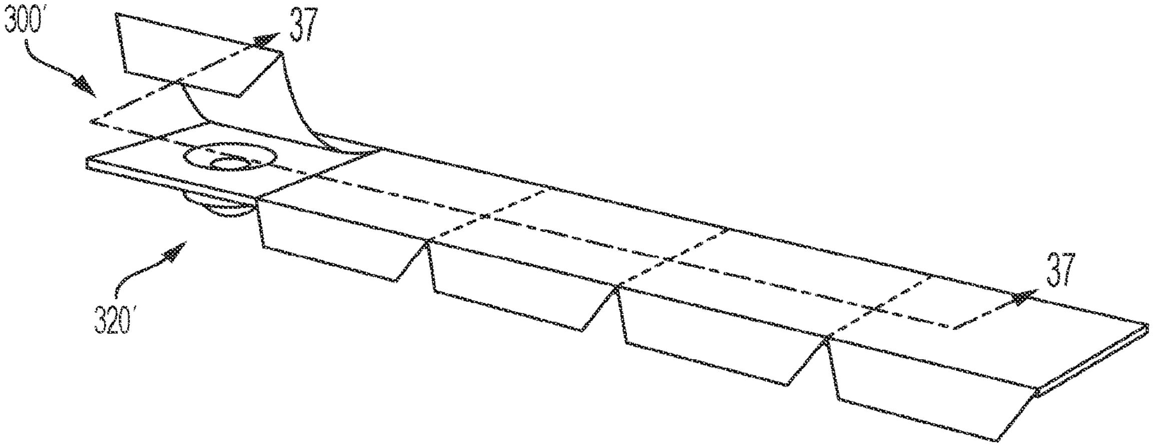
FIG. 36 is a right rear perspective view of a second embodiment of a stopper holder for use in packaging systems disclosed herein.
Figure 37:
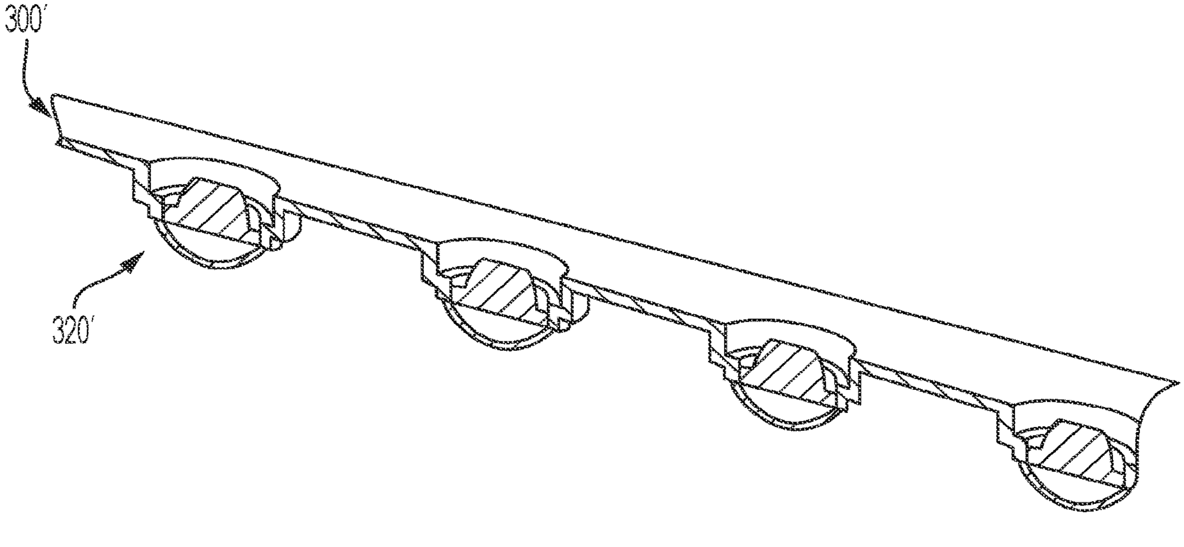
FIG. 37 is a sectional view of the stopper holder of FIG. 36 taken along line 37-37 of FIG. 36.

Turning to FIGS. 1, 4, and 5, the packaging system 10 also preferably includes a stopper holder 300, which in the illustrated embodiment includes a central panel 310 and with two side panels 312 joined thereto by living hinges 314. Each living hinge described herein, including without limitation the living hinge 314, is preferably a thinned portion of the same material as the two parts joined by the living hinge, in this case the side panels 312. The living hinge 314 is disposed between the two side panels 312 to allow pivoting motion therebetween. Alternatively, a stopper holder 300' may have a row of stopper cells 320' arranged linearly in a single, generally planar strip, as shown in FIGS. 36 and 37. The stopper cells 320' may be sealed by adhesive panels 330'. The stopper cells 320' may have minimal side walls, or the side walls may even be eliminated entirely. The stopper holder 300, 300' is preferably constructed of a molded polymeric material.

Referring again to FIGS. 1-17, arranged on the side panels 312 is at least one stopper cell 320, and preferably a plurality of stopper cells 320, which conveniently may be located at regularly spaced intervals. The stopper holders 320 preferably align with the container cells 120 of the container tray 100. In the stopper holder 300, each stopper cell 320 may form a generally cylindrically shaped closed body with a distal opening 322, an interior space 324, a proximal inner surface 326 opposite the distal opening 322, a side wall 328, a proximal outer surface 330, and a side outer surface space 332. A proximal wall 325 is formed between the proximal inner and outer surfaces 326, 330. Note that the side wall 328 may be formed with a minimal height or eliminated entirely, leaving a stopper cell 320' (see FIGS. 36 and 37) that is essentially dome-shaped (i.e., the proximal outer surface 330 would interface with the side panel 312). The stopper cell 320 releasably secures the stopper 200 therein and is adapted to release the stopper 200 into the fill opening 22 of the vial 20 when a compressive force is exerted on the proximal outer surface 330 of the stopper cell 300. The securing of the stopper 200 preferably occurs through an interference friction fit, preferably a mild interference fit, between the stopper 200 and the side inner surface 328 of the stopper cell 320. The proximal outer surface 330 of the stopper cell 320 is preferably curved outwardly with respect to the interior space 324.

Figure 11:
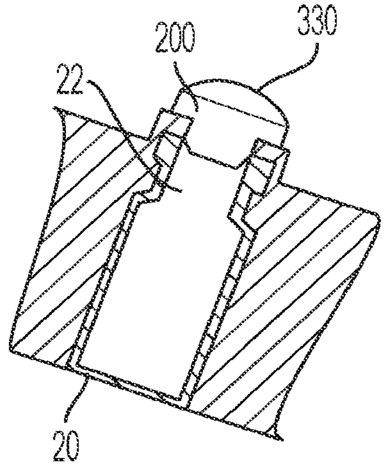
FIGS. 11 and 12 are partial schematic cutaway views showing insertion of a stopper into a vial from a stopper cell as in the packaging system of FIG. 1.
Figure 12:
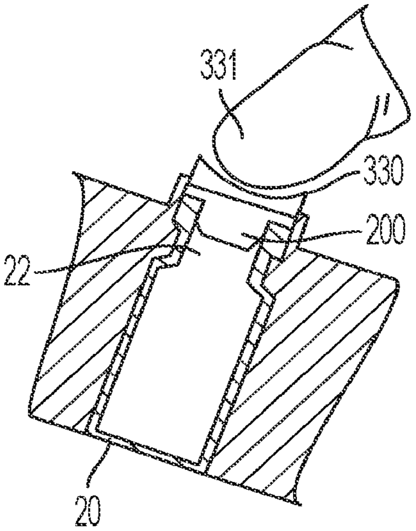
Figure 13:
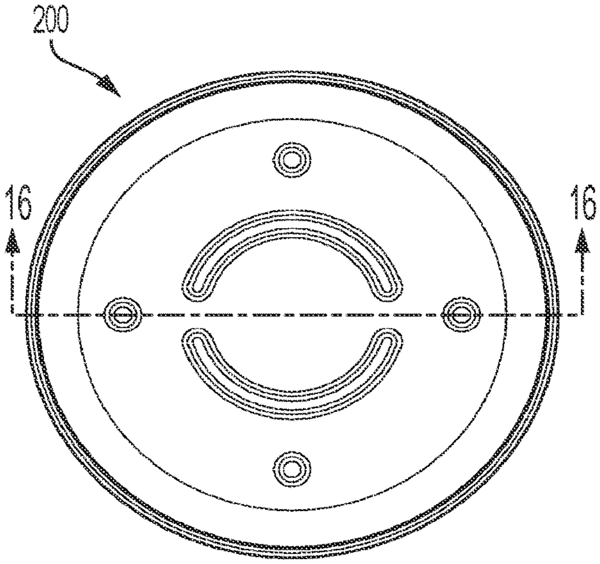
FIG. 13 is a top plan view of an exemplary stopper for use in a packaging system according to the invention.
Figure 14:
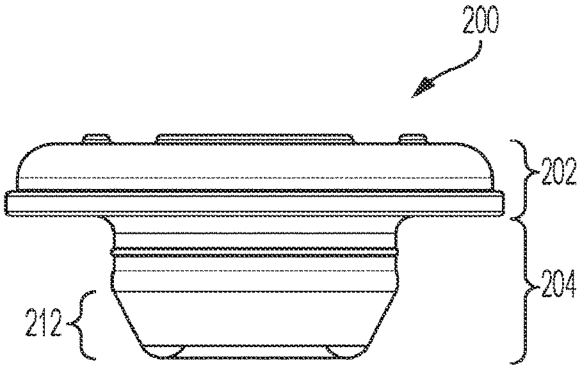
FIG. 14 is a side elevational view of the stopper of FIG. 13.
Figure 15:
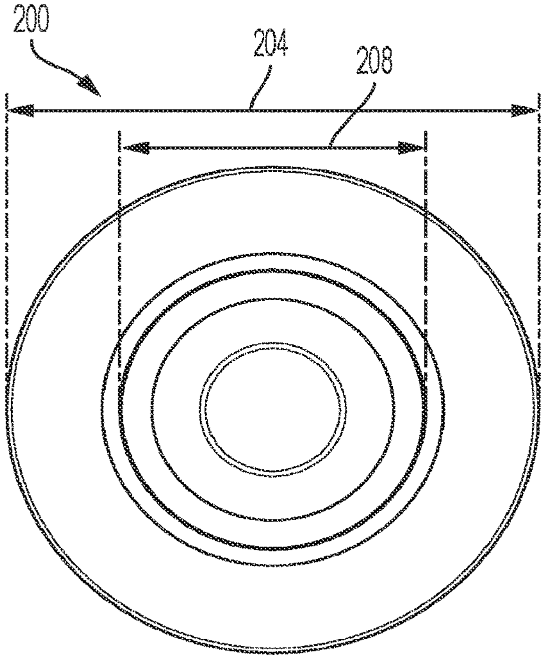
FIG. 15 is a bottom elevational view of the stopper of FIG. 13.
Figure 16:
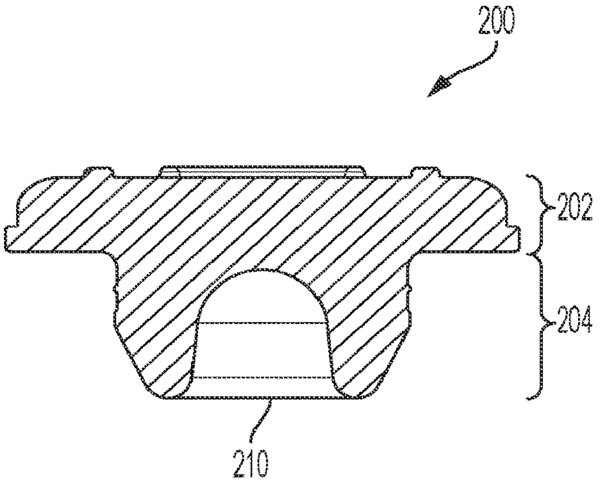
FIG. 16 is a sectional view of the system of stopper 13, taken along the line 16-16 in FIG. 13.

The stopper cell 320 is preferably constructed by thermoforming of a flexible polymer, such as polyethylene or PETG (polyethylene terephthalate glycol-modified, from which at least a portion of the stopper cell 320 (such as the proximal wall 325 and the side wall 328), and the stopper holder 300, may be formed. Alternatively, in an embodiment not shown, the stopper cell 320 may be constructed from a rigid material and have a living hinge along the interface between the stopper cell 320 and the side panel 312 or between the proximal wall 330 and the sidewall 328. Referring particularly to FIGS. 11 and 12, in the embodiment shown, the proximal outer surface 330 of the stopper cell 300 flexes inwardly when the compressive force, such as that which may be applied by a finger tip 331, is exerted thereon, and the proximal wall 325 flexes toward the stopper 200 and exerts a compressive force on the stopper 200 to urge the stopper 200 from the stopper cell 320 and into the fill opening 22 of the vial 20. The container cells 120 may be configured to releasably secure the vials 20 at an outward angle with respect to the container tray 100. This configuration presents the fill openings 22 at a favorable angle for the user to insert the stoppers 200 into the fill openings 22.

Referring to FIGS. 18-31, a second embodiment of a packaging system 410 includes a medicine container in the form of one or more vials 20, the container tray 100, and a corresponding number of stoppers 200 as described above. A shuttle 500 (FIGS. 22-25) has an exterior surface 502 and an interior surface 504. The interior surface 504 is configured for releasably gripping the stopper 200. The shuttle 500 is configured to release the stopper 200 into the fill opening 22 of the vial 20 upon application of a releasing force to the exterior surface 502 of the shuttle 500 (that is, with the user handling the shuttle 500 rather than directly handling the stopper 200) in the manner described below.

The packaging system 410 also includes a shuttle tray 600 with a shuttle cell 620. More particularly, the shuttle tray 600 preferably has a plurality of shuttle cells 620, which preferably are arranged at regularly spaced intervals. The shuttle tray 600 is preferably of a molded polymer material and is stackable upon the container tray 100 (as described above), with the shuttle tray 600 and the container tray 100 accommodating matching quantities of shuttles 500 and vials 20 or other medicine containers.

Figure 20:
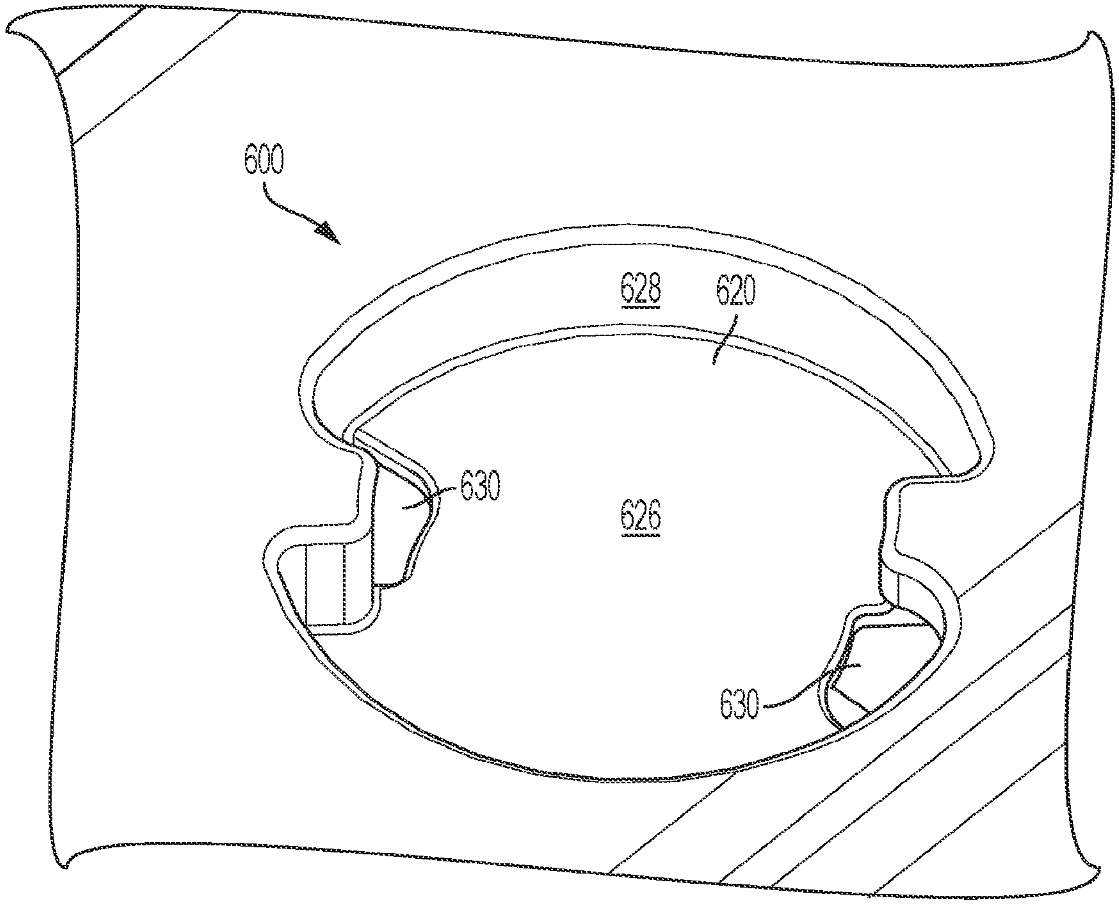
FIG. 20 is a greatly enlarged partial perspective view of the packaging system of FIG. 18.
Figure 21:
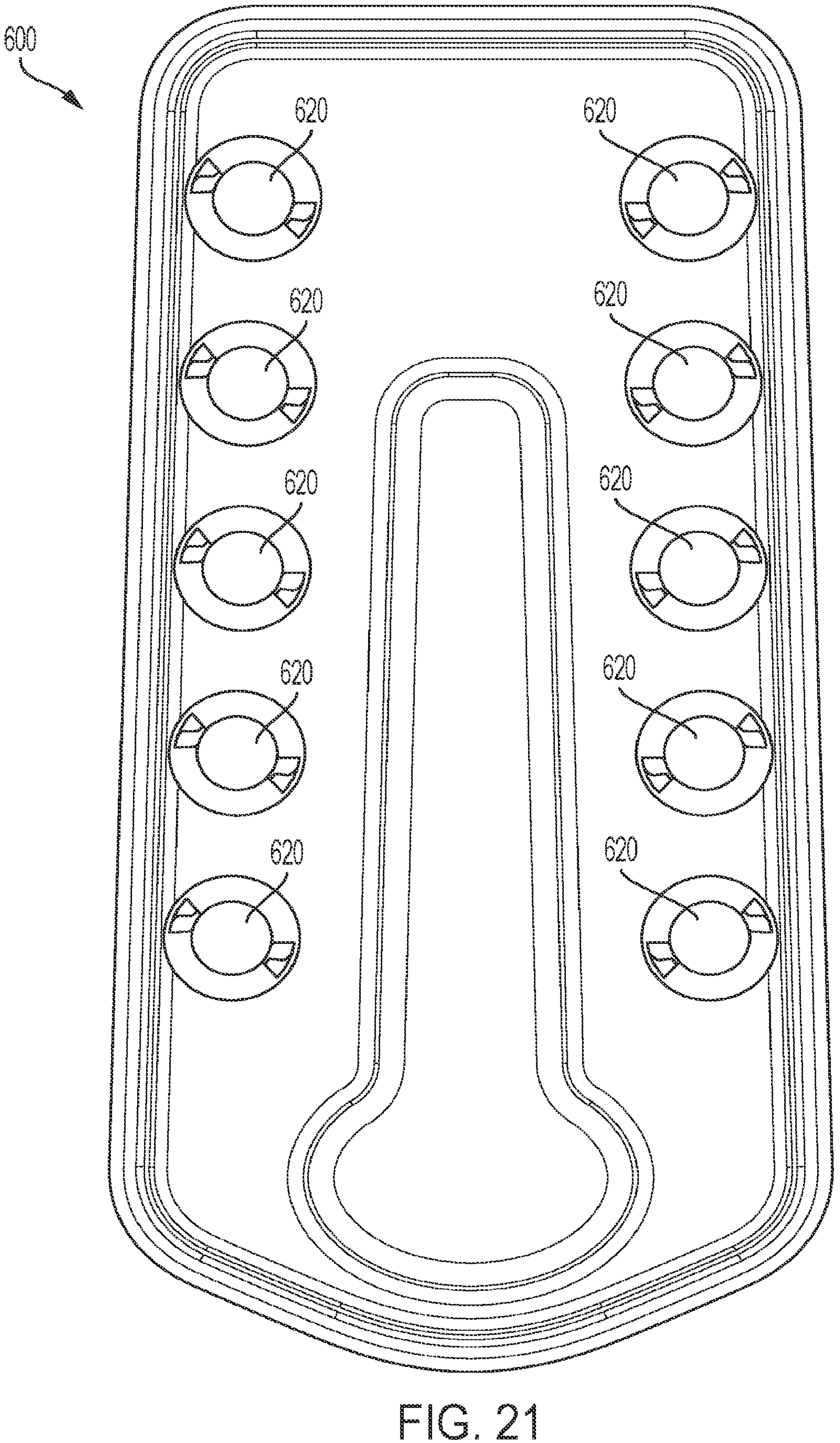
FIG. 21 is a bottom plan view of a shuttle tray for use in the packaging system of FIG. 18.
Figure 22:
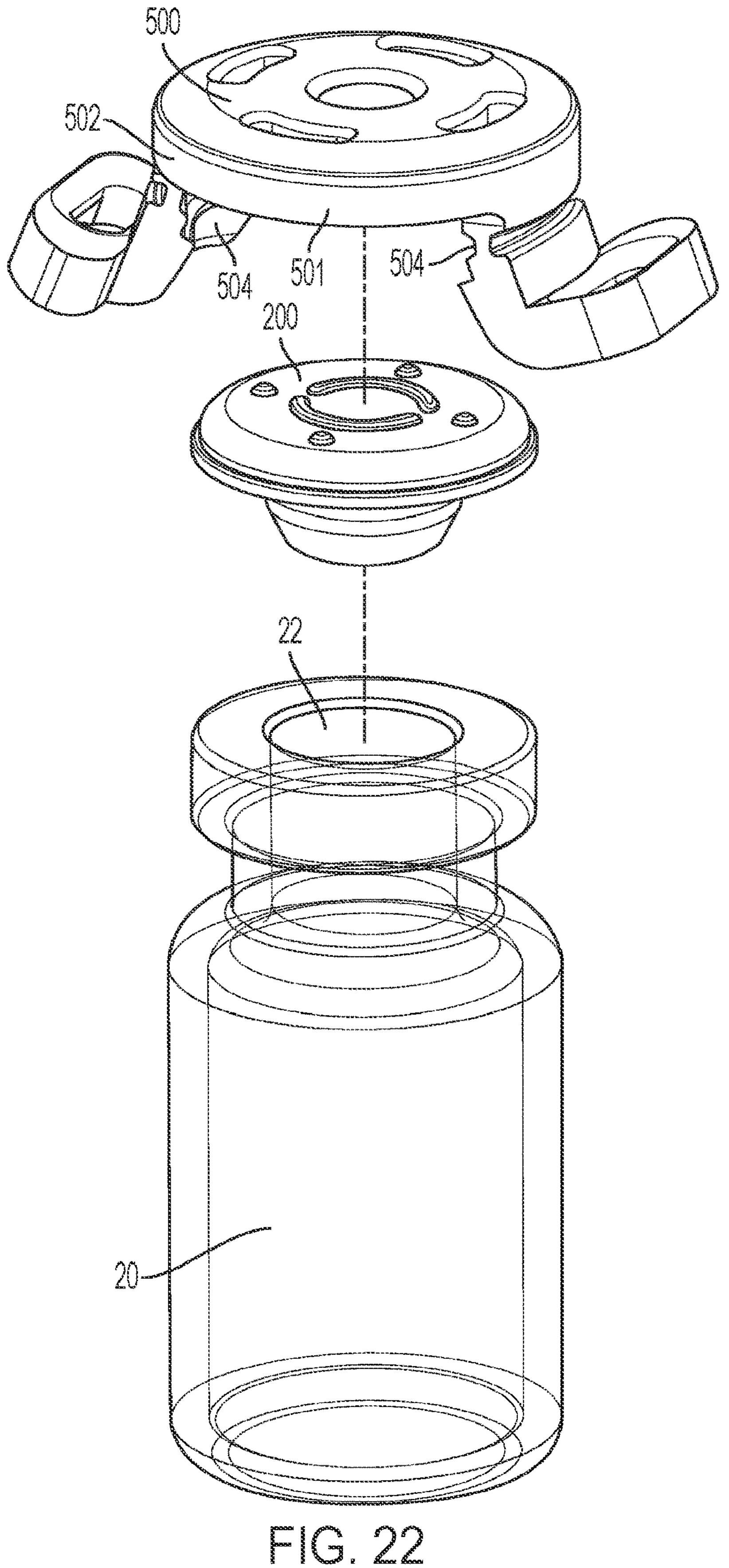
FIG. 22 is an enlarged, exploded partial perspective view of a shuttle and stopper for use in the packaging system of FIG. 18.
Figure 23:
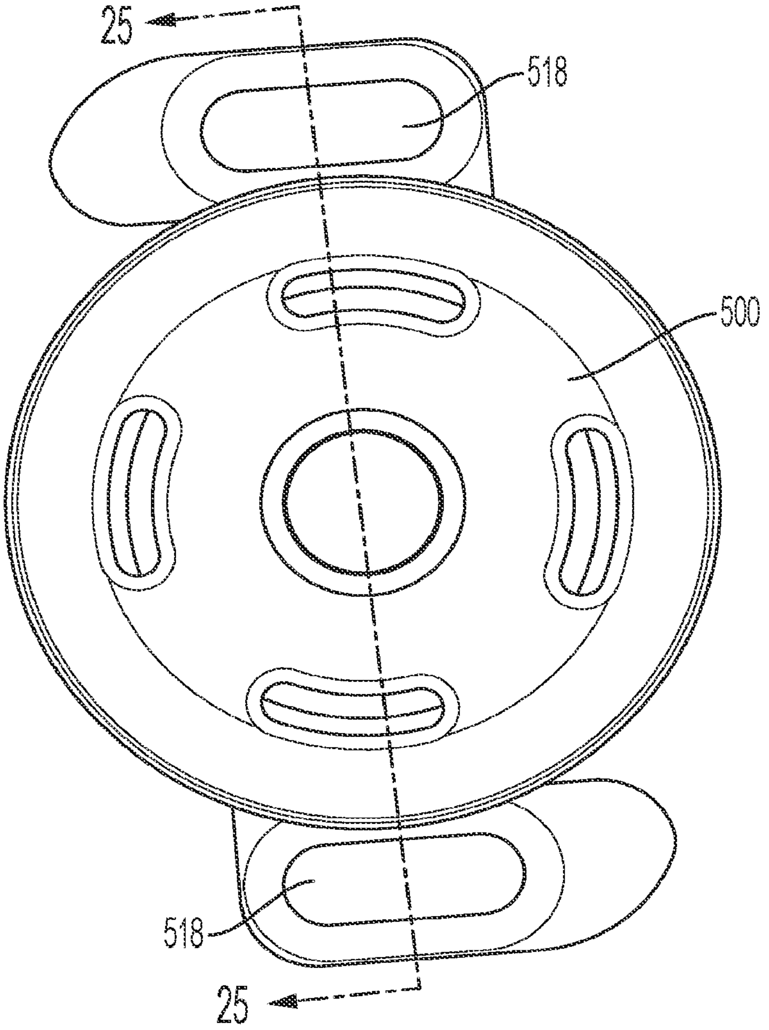
FIG. 23 is a top perspective view of a shuttle for use in the packaging system of FIG. 18.
Figure 24:
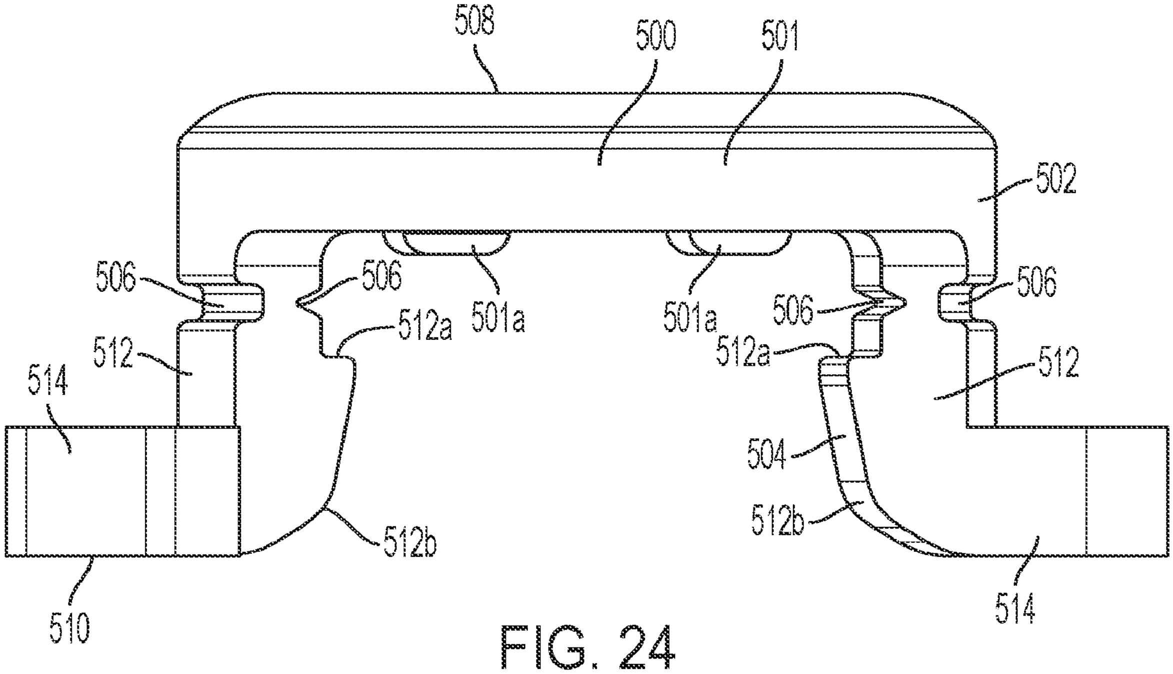
FIG. 24 is a side elevational view of the shuttle of FIG. 23.
Figure 25:
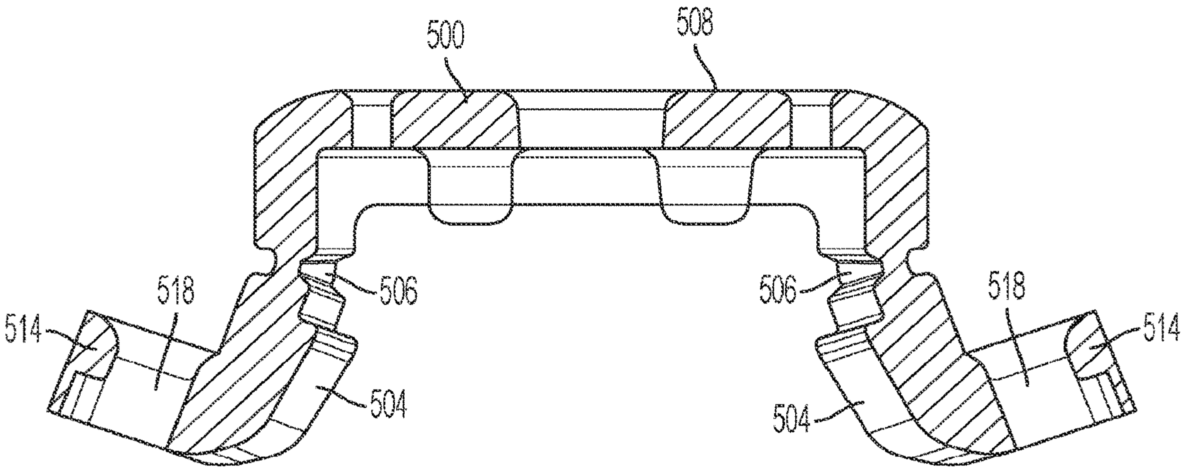
FIG. 25 is a sectional view of the shuttle of FIG. 23 taken along line 25-25 of FIG. 23.
Figure 26:
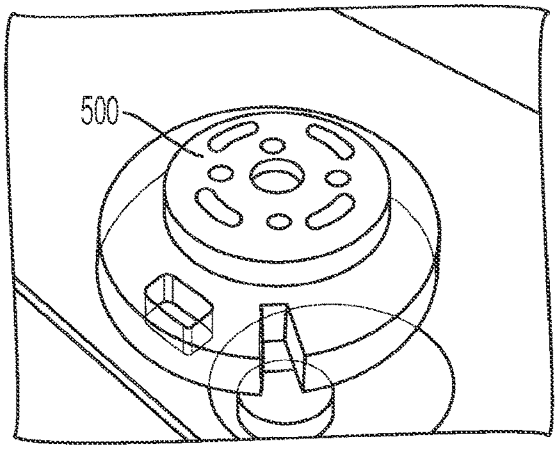
FIG. 26 is a perspective schematic view of a shuttle containing a stopper removably secured in a shuttle tray in the packaging system of FIG. 18.
Figure 27:
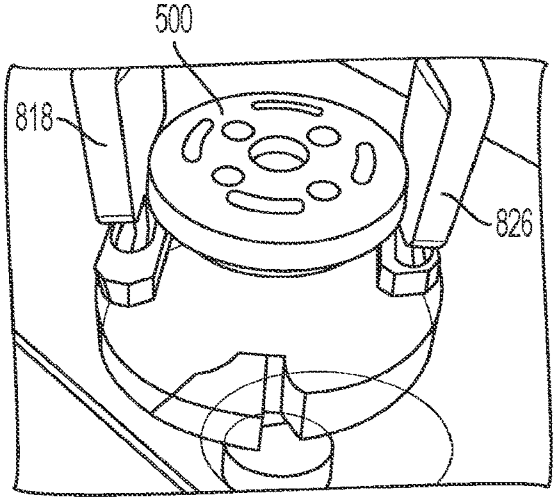
FIG. 27 is a perspective schematic view of the shuttle being released from the shuttle tray of FIG. 26.
Figure 28:
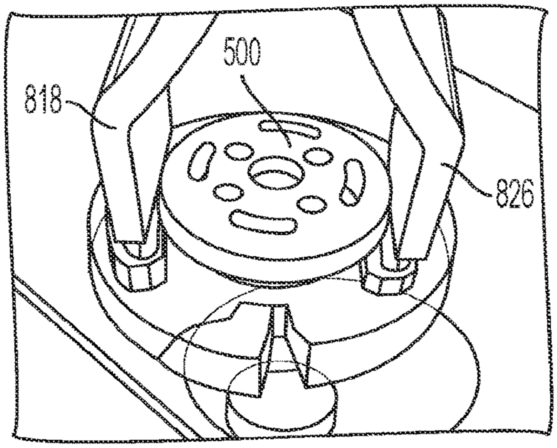
FIG. 28 is a perspective schematic view of a stopper being inserted into a vial via the tool and the shuttle of FIG. 26.
Figure 29:
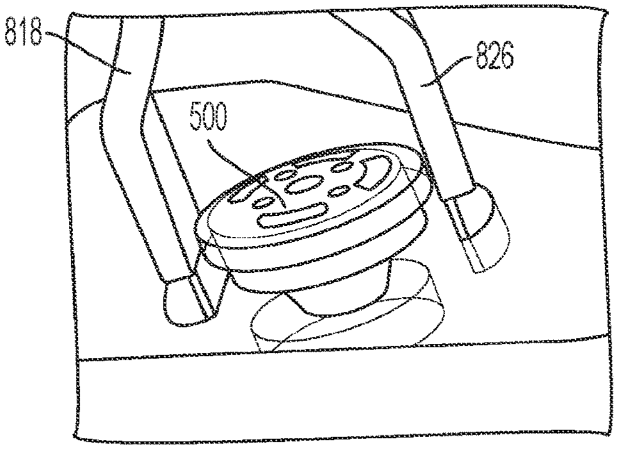
FIG. 29 is a perspective schematic view of the stopper in the vial of FIG. 28, with the stopper being released from the shuttle via the tool.

Referring to FIGS. 20-21, each shuttle cell 620 forms a generally cylindrical closed body with a proximal opening 622, an interior space 624, a bottom inner surface 626 opposite the proximal opening 622, and a side inner surface 628. The shuttle cell 620 releasably secures the shuttle 500 therein. One of the bottom inner surface 626 and the side inner surface 628 of the shuttle cell 620 has a lock opening 630 for engaging portions of the shuttle 500 (see below) to secure the shuttle 500 in the shuttle cell 620.

The exterior surface 502 extends over the various exterior contours and features of the shuttle 500, and the interior surfaces 504 similarly extend over the various interior contours and features of the shuttle 500. The shuttle 500 has a generally cylindrical body 501 with a proximal end 508, a distal end 510, first and second distally extending legs 512 attached to the body 501, and distally extending ribs 501*a*. The first and second distally extending legs 512 include transversely extending locking mechanisms 514. Notches 506 are located on the exterior surface and the interior surface 504 extending into the first and second distally extending legs 512. The notches 506 on the first and second legs 512 provide a point of flexion of the legs 512, allowing the legs 512 to move more easily to secure and release the stopper 200. The first and second legs 512 also include first and second proximally facing stopper supports 512*a*, which engage the major portion 202 of the stopper 200 to secure the major portion between the stopper supports 512*a* and the ribs 501*a*. First and second tool fittings in the form of tool openings 518 are formed in each of the first and second legs 512 (and more particularly in the locking protrusions 514) for releasably engaging a tool, preferably a curved tool 800 (FIG. 31) so that a movement of the tool 800 causes deformation of the legs 512, causing the legs 512 to flex outwardly and thereby disengage the notches stopper supports 512*a* from the stopper 200, thereby releasing the stopper 200 from the shuttle 500. Moreover, the first and second legs 512 have curved portions 512*b* for contacting the vial flange 23 of the vial 20. Distal movement of the shuttle 500 causes the vial flange 23 to press against the curved portions 512*b*, aiding in outward flexion of the legs 512 and thus in release of the stopper 200 from the shuttle 500. The form and operation of the curved tool 800 are discussed in more detail below.

The locking protrusions 514 extend radially outwardly, and are configured for engaging the lock openings 630 of the shuttle cell 620 to releasably secure the shuttle 500 in the shuttle cell 620. In the illustrated embodiment, the lock opening 620 is configured so that the shuttle 500 may be placed in the shuttle cell 620 and rotated to engage and disengage the locking protrusions 514 from the lock openings 630, thereby securing and releasing the shuttle 500 from the shuttle cell 620.

As discussed in more detail below, the shuttle 500 enables a user to handle and release the stopper 200 by employing a tool such as the tools 700, 800 touching only the exterior surface 502 of the shuttle 500, so that any tool employed by the user does not touch, and therefore does not potentially foul or contaminate, the stopper 200. The shuttle 500 is configured to release the stopper 200 into the fill opening 22 of a vial 20 upon application of a releasing force to the exterior surface 502 of the shuttle.

Figure 32:
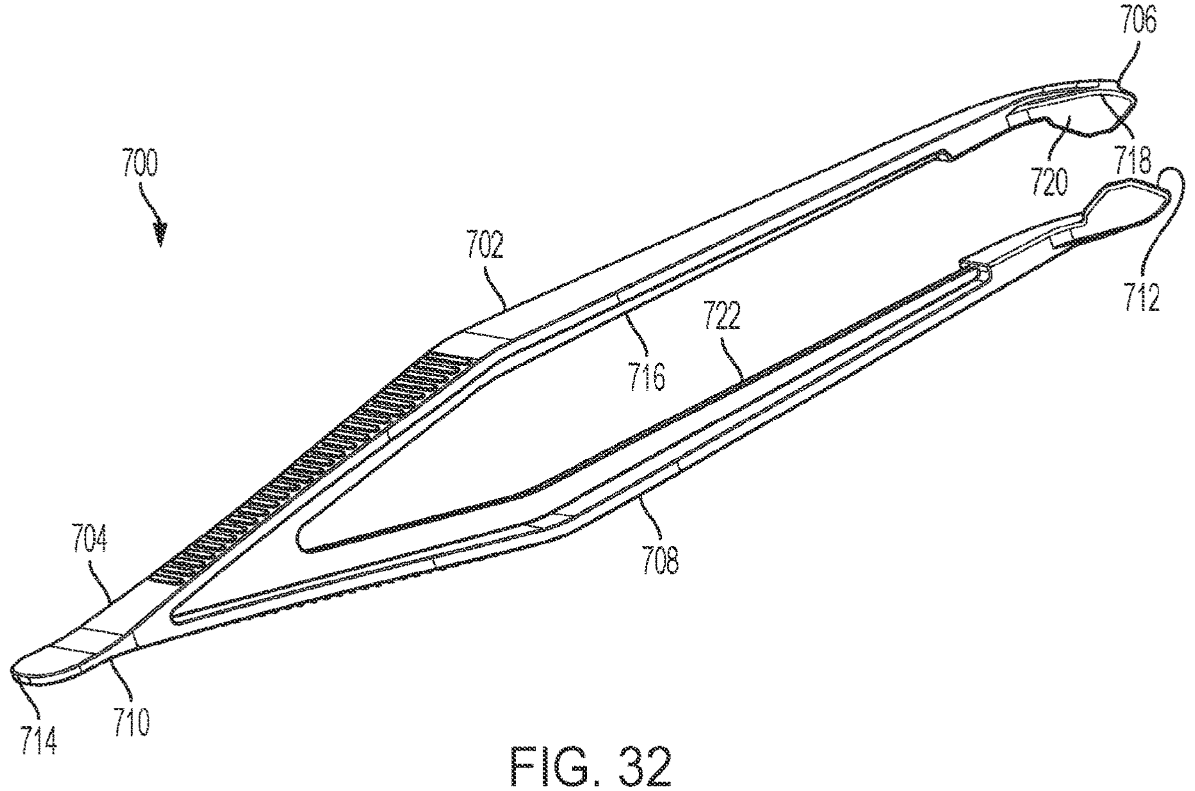
FIG. 32 is an enlarged, partial perspective view of a stopper-handling tool for use with the packaging systems disclosed herein.

The tools 700, 800 may be used with one or more of the packaging systems disclosed herein. Referring to FIG. 32, a straight tool 700 may be used with the packaging system 410, and generally with the packaging systems disclosed herein, for engaging the stopper 200. The straight tool 700 comprises a first arm 702 having a first proximal end 704 and a first distal end 706 and a second arm 708 having a second proximal end 710 and a second distal end 712. The first proximal end 704 and the second proximal 710 end are joined to each other at a proximal joint, which may be a pinned joint but, as shown in the figure, the proximal joint is shown as an integral formation 714 of the first and second proximal ends 704, 710, such that the tool 700 functions similarly to a tweezer. The first arm 702 has a first-arm interior surface 716 facing the second arm 708, a first gripping surface 718 facing the second arm 708, and a first abutment surface 720 perpendicular to the first gripping surface. The second arm has a second-arm interior surface 722 facing the first arm 702, and a second gripping surface and a second abutment surface (not numbered), which are mirror images of the first gripping surface 718 and the first abutment surface 720. The first gripping surface 718 of the first arm 702, and the mirror image thereof on the second arm 708, facilitate gripping the stopper 200 by the major portion 202 to avoid contamination of the minor portion 204. The gripping surface 718 is preferably curved to match the major portion 202 of the stopper 200. The first abutment surface 720 of the first arm 702, and the mirror image thereof on the second arm 708, facilitate pressing the stopper 200 into the fill opening 22 of the vial 20.

Figure 31:
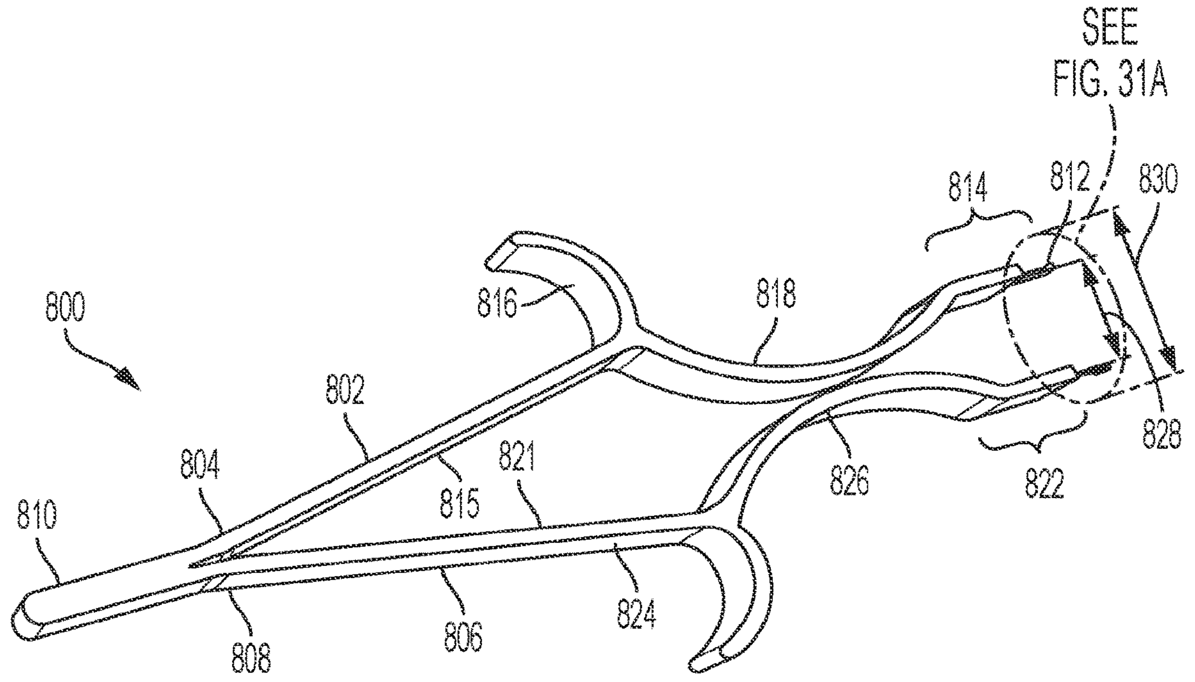
FIG. 31 is a top perspective view of a first embodiment of a shuttle-handling tool for use with the packaging system of FIG. 18.
Figure 31A:
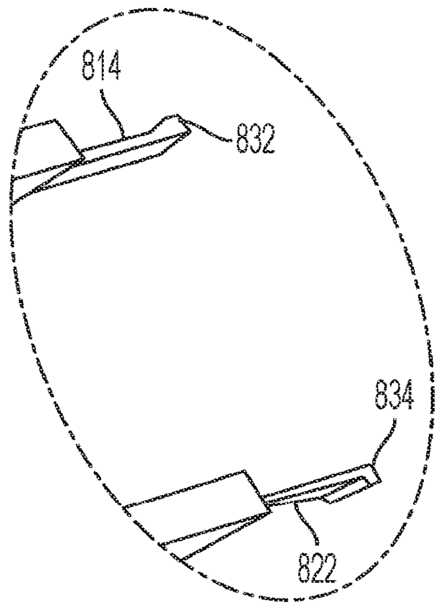
FIG. 31A is an enlarged partial view of the shuttle-handling tool of FIG. 31, showing a portion thereof as indicated in FIG. 31.

Referring to FIG. 31, the curved tool 800 may be used with the packaging system 410, and generally with the packaging systems disclosed herein, for engaging the tool opening 518 and, where applicable the stopper 200. The curved tool 800 includes a first arm 802 having a first proximal portion 804. A second arm 806 has a second proximal portion 808. The first proximal portion 804 and the second proximal portion 808 are joined to each other at a proximal joint, which in the illustrated embodiment is an integral formation 810 of the first and second arms 802, 806. The first arm 802 has a first distal end 812 and a first distal end portion 814 extending proximally from the first distal end 812, a first interior surface 815 facing the second arm 806, and an opposite first exterior surface 816, with the first interior surface 814 having a first curved portion 818 extending convexly towards the second arm 806. The second arm 806 has a second distal end 820 and a second distal end portion 822 extending proximally from the second distal end 820, a second interior surface 821 facing the first arm 802, and an opposite second exterior surface 824, with the second interior surface 821 having a second curved portion 826 extending convexly toward the first arm 802, which faces but is spaced from the front curved portion 818. Operation of the first and second curved portions 818, 826 of the tool 800 is expected to generate fewer particulates than other devices for this purpose. Further, the tool 800 can be formed with a single mold, which is an advantage in manufacturing.

In use, the stopper 200 is preloaded into the shuttle 500 with the major portion 202 of the stopper 200 located between the ribs 501*a* and the stopper supports 512*a* of the shuttle 500. The preloading process is done at a manufacturing facility by assembly equipment unrelated to the present disclosure. The shuttle 500 with the stopper 200 preloaded is then ready for installation using the curved tool 800 to place the stopper 200 in the fill opening 22 of the vial 20 as described in more detail below. In the initial position, the first arm 802 and the second arm 806 are aligned and biased so that when no exterior force is applied to the curved tool 800, the first distal end portion 814 and the second distal end portion 822 are aligned at a first distal-end-portion distance 828 less than a diameter of the stopper 200 (preferably less than the major diameter 204 of the stopper), and so that upon application of a first compressive force upon the first exterior surface 816 and the second exterior surface 824, the first curved portion 818 merely contacts the second curved portion 826, which would slightly reduce the first distal-end-portion distance 828. The first curved portion 818 and the second curved portion 826 are curved in complementary fashion (here as mirror images of one another) so that upon application of a second compressive force greater than the first compressive force upon the first exterior surface 816 and the second exterior surface 824, the first arm 802 flexes and deforms, and the second arm 806 flexes and deforms, such that the first distal end portion 814 and the second distal end portion 822 move apart to a second distal-end-portion distance 830 (in phantom) greater than the first distal-end-portion distance 828. The first arm 802 and the second arm 806 are configured and biased so that upon application of the second compressive force upon the first exterior surface 816 and the second exterior surface 824 via the tool openings 518, the first and second portions 818, 826 flex such that the first distal end portion 814 and the second distal end portion 822 move apart to permit the shuttle 500 to be grasped therebetween. That is, once the first and second distal end portions 812, 822 are located in the tool openings 518, the second compressive force is released resulting in the first and second distal end portions 812, 822 flexing inwardly to grip the radially inward surfaces of the tool openings 518 and thus clamping the shuttle 500 and stopper 200 between the first and second distal end portions 812, 822 for ease of handling.

The curved tool 800 can now be used to position the stopper 200 in the fill opening 22 of the vial 20. To release the stopper 200 from the shuttle 500, a fourth compressive force is applied to the first exterior surface 816 of the first arm 802 and the second exterior surface 824 of the second arm 806, the first distal end portion 814 and the second distal end portion 824 move apart to permit the first arm 802 and the second arm 806 to engage the radially outward surfaces of the first and second tool openings 518 of the shuttle 500 to move the first and second legs 512 of the shuttle 500 outwardly to cause the first and second notches 506 of the first and second legs 512 of the shuttle 500 to release the stopper 200. The first distal end portion 814 of the first arm 802 has an outwardly facing first step 832, and the second distal end portion 824 of the second arm 806 has an outwardly facing second step 834, for engaging the first and second tool openings 518 of the shuttle 500. The shuttle 500 can then be removed from the curved tool 800 releasing the first and second arms 802, 806 until the first and second distal end portions 812, 822 can be removed from the tool openings 518. At this point, the shuttle 500 can be reused if desired by returning to the manufacturing facility for reloading a stopper 200 or recycled.

Figure 33:
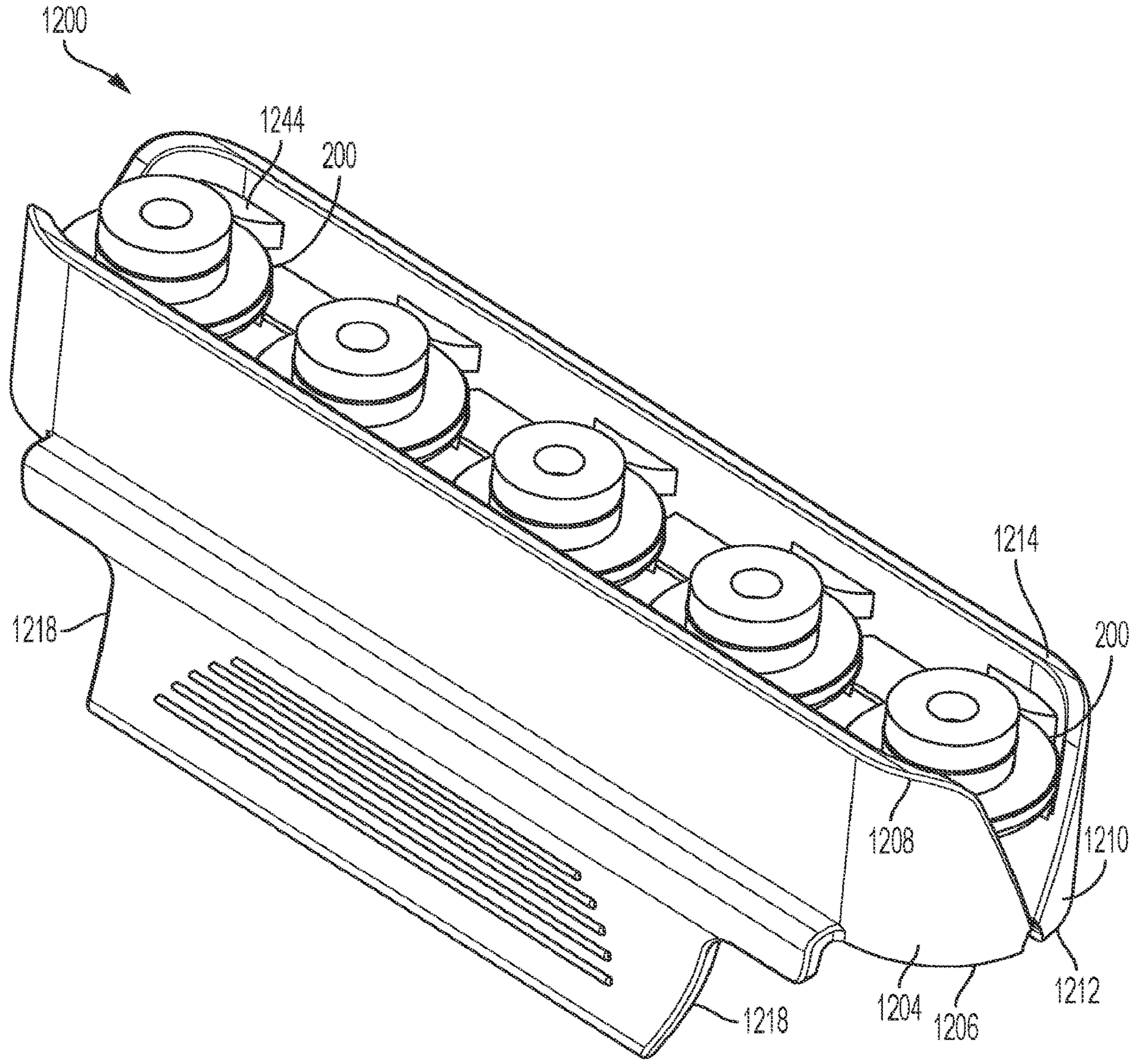
FIG. 33 is an inverted bottom perspective view of a stopper clip according to an embodiment of the invention.
Figure 34:
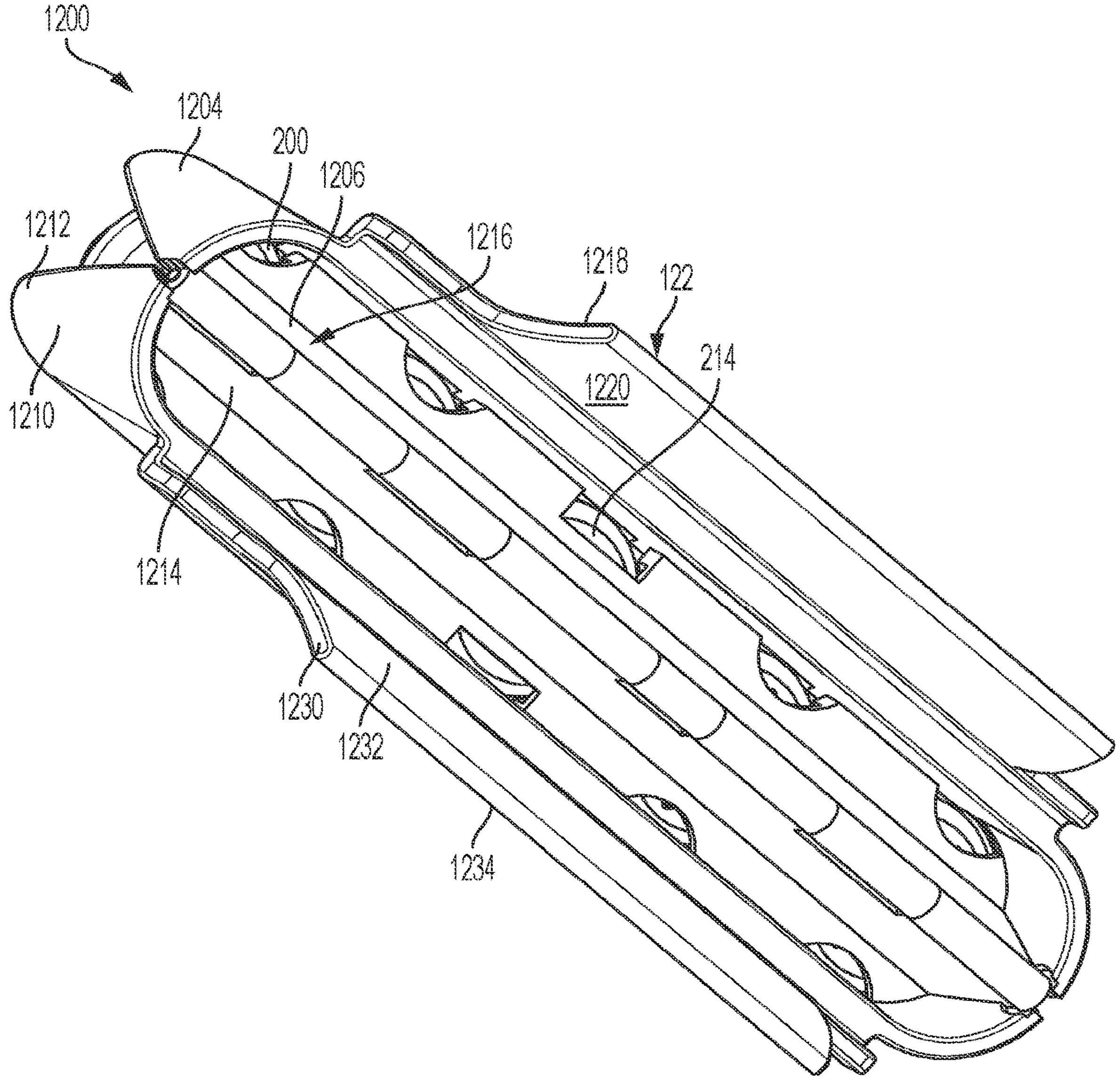
FIG. 34 is a top perspective view of the stopper clip of FIG. 33.

Referring to FIGS. 33-35, a third embodiment of a packaging system also includes a medicine container in the form of the vial 20 (and preferably includes a plurality of vials 20), along with the stopper 200 as described above, and may include a container tray 100 as described above.

A stopper clip 1200 comprises a hinged base having first and second hinged-base legs 1204, 1210, the first hinged-base leg 1204 having a first proximal hinged-base-leg end 1206 and a first distal hinged-base-leg end 1208, and the second hinged-base leg 1210 having a second proximal hinged-base-leg end 1212 and a second distal hinged-base-leg end 1214, the first and second proximal hinged-base-leg ends 1208, 1214 being joined to each other by a hinge 1216. In an alternative stopper clip 1200', the hinged-base-leg ends 1208, 1214 may be joined by a living hinge 1216' disposed between the first and second hinged-base legs 1204, 1210 (see FIG. 35). Referring again to FIGS. 33-35, the hinge 1216, 1216' is biased to urge the first and second distal hinged-base-leg ends 1208, 1214 toward one another to a first position, which is a resting position of the stopper clip 1200 when empty (with no stoppers 200 therein). As shown in FIGS. 33 and 35, the hinged-based legs 1204, 1210 are configured so that, when in the first position, the legs 1204, 1210 grip the stopper 200.

The first hinged-base leg 1204 has a first lever 1218 extending proximally therefrom, and the second hinged-base leg 1210 has a second lever 1230 extending proximally therefrom. The first lever 1218 has a first interior lever surface 1220 facing the second lever 1230 and a first exterior lever surface 1222 facing opposite the first interior lever surface 1220. The second lever 1230 has a second interior lever surface 1232 facing the first lever 1218 and a second exterior lever surface 1234 facing opposite the second interior lever surface 1232.

The first lever 1218 and the second lever 1230 are in spaced relation and operate in the manner of a clothes pin or clip such that, upon the application of a first compressive force to the first exterior lever surface 1222 and the second exterior lever surface 1234, the first hinged-base leg 1204 and the second hinged-base leg 1210 are urged to a second position, with the first and second hinged-base legs 1204, 1210 being spaced apart to allow insertion of the stoppers 200 between the first and second hinged-base legs 1204, 1210 to be releasably secured therebetween. See FIG. 35B.

Figure 35A:
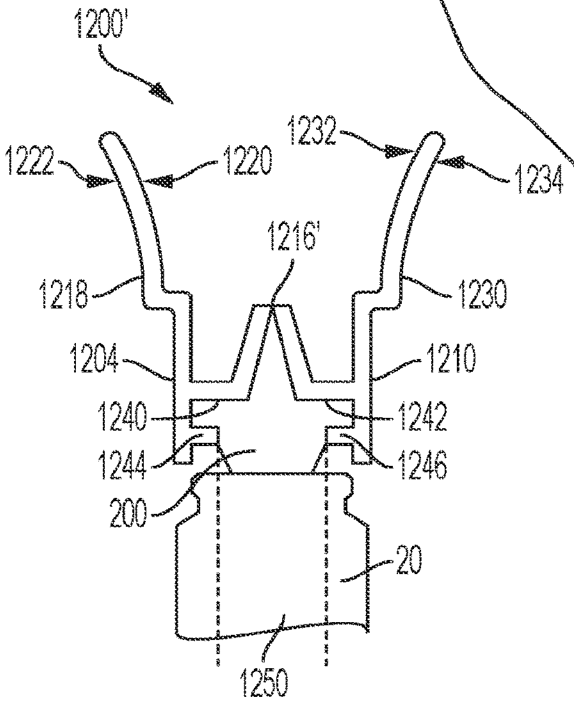
FIGS. 35A and 35B are schematic sectional views showing use of a second embodiment of a stopper clip according to the invention.
Figure 35B:
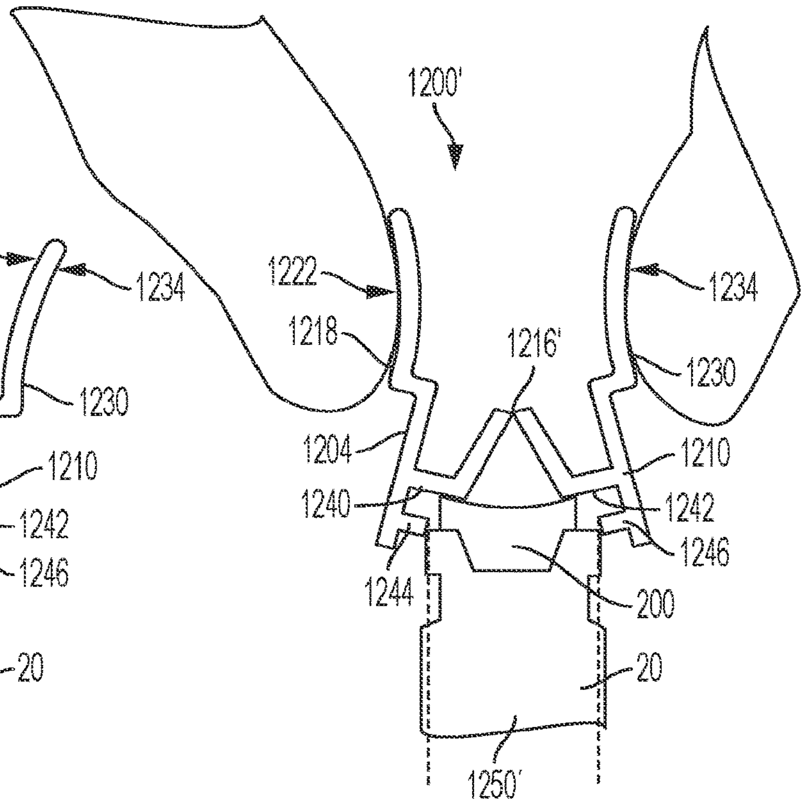

The first hinged-base leg 1204 has a first pushing surface 1240 adapted to make contact with the proximal end surface 214 of the stopper 200 when the stopper 200 is secured between the first and second hinged-base legs 1204, 1210, and the stopper 200 is aligned with the fill opening 22 of the vial 20, and the stopper clip 1200 is urged distally to urge the stopper 200 into the fill opening 22. Similarly, the second hinged-base leg 1210 has a second pushing surface 1242 adapted to make contact with the proximal end surface 214 of the stopper when the stopper 200 is secured between the first and second hinged-base legs 1204, 1210, and the stopper 200 is aligned with the fill opening 22 of the vial 20, and the stopper clip 1200 is urged distally to urge the stopper 200 into the fill opening 22. The first hinged-base leg 1204 has a first retention arm 1244 projecting toward the second hinged-base leg 1210, and the second hinged-base leg 1210 has a second retention arm 1246 projecting toward the first hinged-base leg 1204. Upon removal of the first compressive force, the first and second hinged-base legs 1204, 1210 are urged to a third position, which may be the same as the first position or different therefrom, so that the first and second hinged-base legs 1204, 1210 come together to releasably secure the stopper 200 therebetween (FIGS. 33, 35A).

Figure 33A:
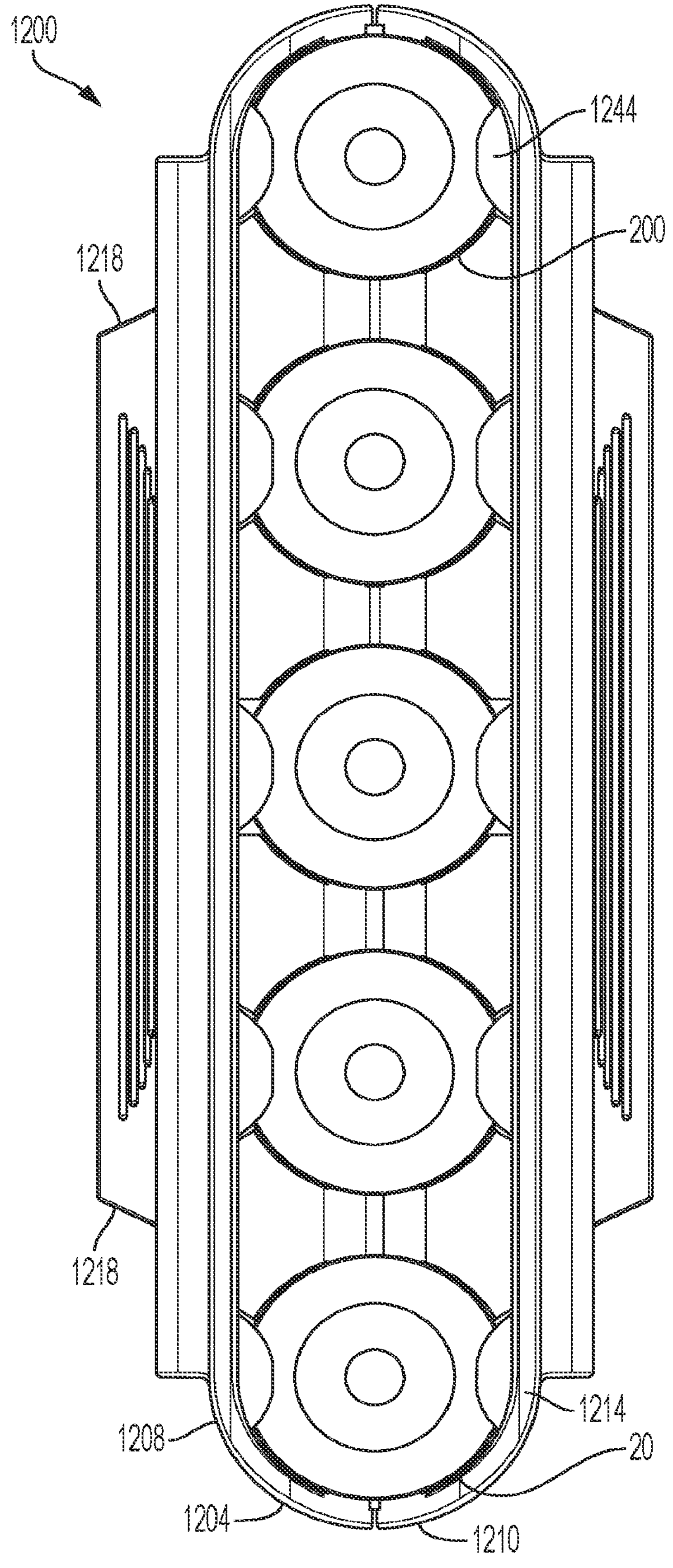
FIG. 33A is bottom view of the stopper clip of FIG. 33.

The first retention arm 1244, 1244' and the second retention arm 1246, 1246' are configured and aligned to create a retention gap 1250, 1250' (see FIG. 33A) therebetween, a dimension of the retention gap 1250, 1250' being smaller than the major diameter 204 of the stopper 200 and greater than or equal to the minor diameter 208 of the stopper 200. The first retention arm 1244, 1244' and the second retention arm 1246, 1246' together support the stopper 200 to prevent distal movement of the stopper 200 when the stopper 200 is secured between the first and second hinged-base legs 1204, 1210 in the second position.

Preferably the stopper clip 1200, 1200' is used with a container tray having a plurality of container cells similar to that described above in FIGS. 1-17. The use of the stopper clip 1200 allows the simultaneous gripping and insertion of a plurality of stoppers 200 into a corresponding plurality of vials 20, by manipulating the first and second levers 1218, 1230 toward each other to grip and release the stoppers during the insertion process.

Figure 38:
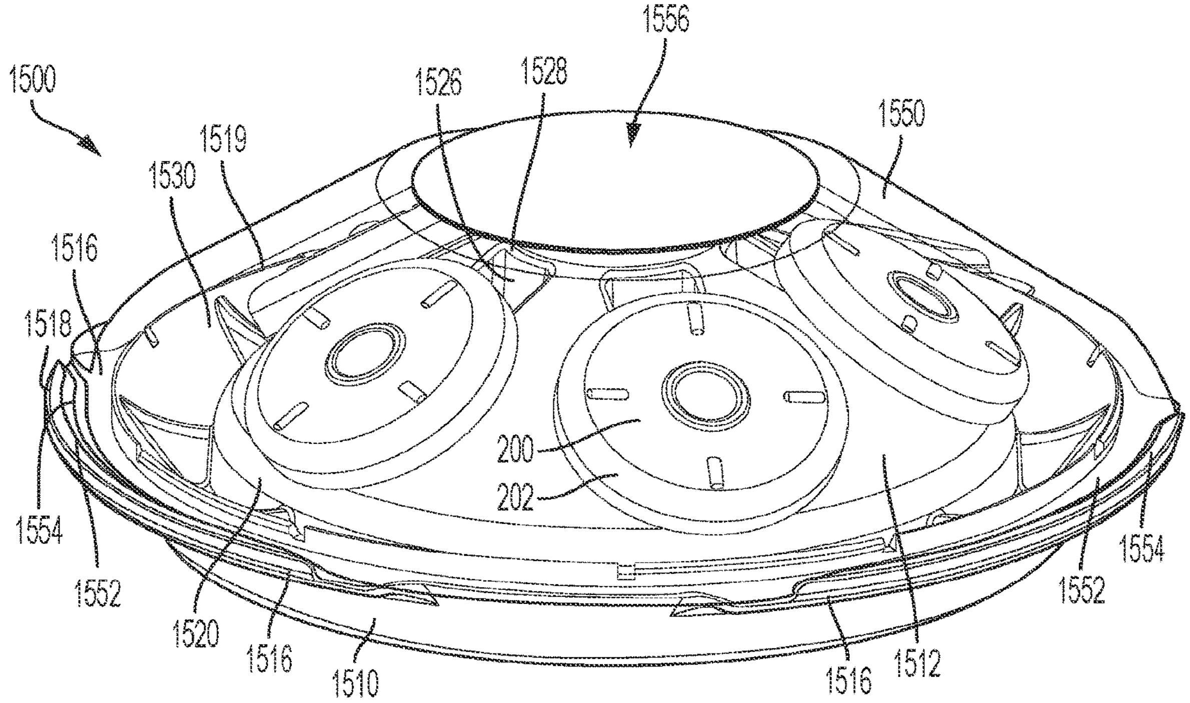
FIG. 38 is a front perspective view of a third embodiment of a stopper handling system according to the invention.
Figure 39:
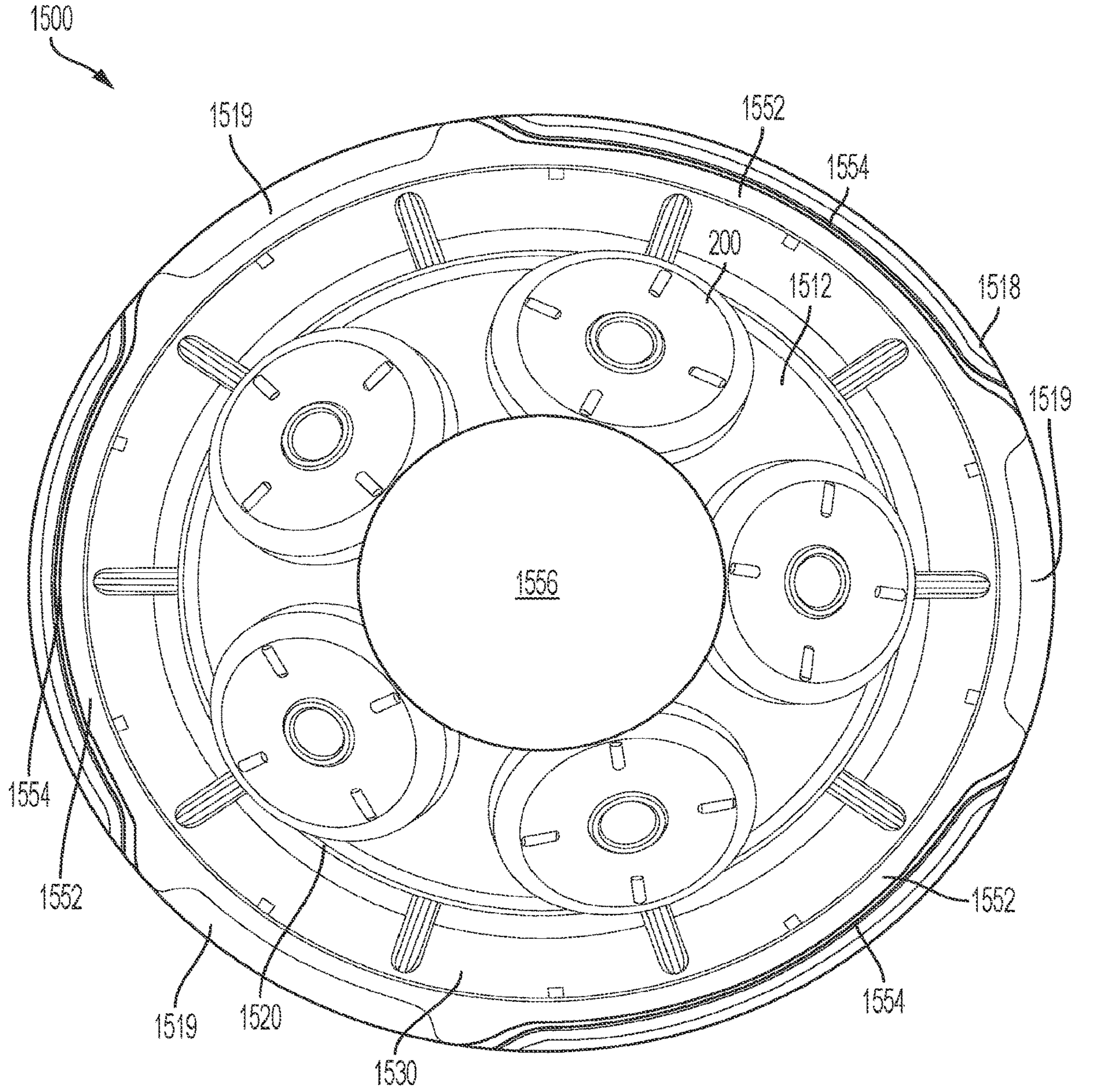
FIG. 39 is a top elevational view of the stopper handling system of FIG. 38.
Figure 40:
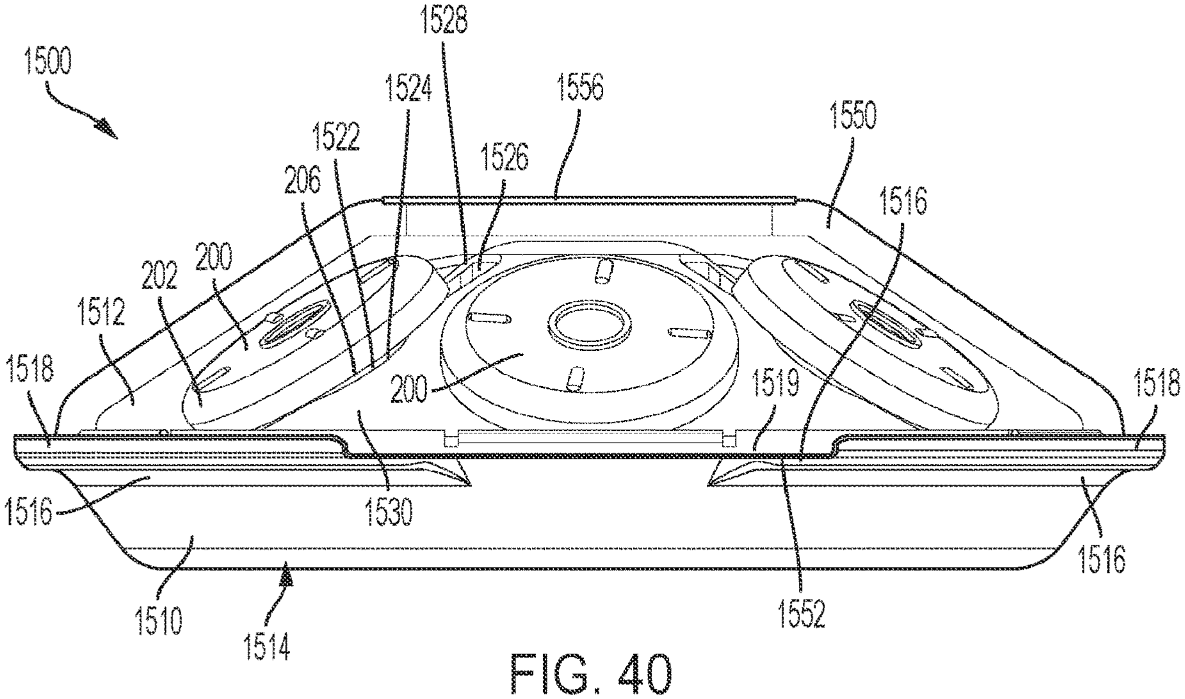
FIG. 40 is a side elevational view of the stopper handling system of FIG. 38.

Referring to FIGS. 38-40, a system for handling stoppers for medication containers includes a plurality of stoppers 200 as described above. A handling tray 1500 includes a base 1510, a plurality of stopper rests 1520 disposed upon the base 1510 for releasably securing the plurality of stoppers 200 to the base 1510. The base 1510 has an upper surface 1512 and a lower support surface 1514. The upper surface 1512 is spaced from and angled upwardly with respect to the lower support surface 1514 in the form of a cone for convenient access to the stoppers 200.

A transparent cover 1550 is releasably and sealingly connected to the base 1510 for covering the stoppers 200. The cover 1550 has a cover-flange perimeter 1552 and a plurality of spaced and outwardly extending circumferential cover flanges 1554 extending therefrom. The cover 1510 may include a disinfectant-permeable panel 1556 for sterilization of the contents of the handling tray 1500. The base 1510 has an outwardly extending circumferential base flange 1516 extending therefrom, and the base flange 1516 in turn has a plurality of spaced and upwardly extending cover-retaining walls 1518 extending therefrom. The cover-retaining walls 1518 form a plurality of cover-retaining gaps 1519 therebetween used for removing the cover 1550. The cover-retaining walls 1518 and the base flanges 1516 of the base 1510 are spaced such that in a first position the cover 1550 is supported upon the base flange 1510 with the cover flanges 1554 being supported in the cover-retaining gaps 1519. In a second rotated position, the cover flanges 1554 are aligned with and in contact with the cover-retaining walls 1518 of the base 1510 to releasably secure the cover 1550 to the base 1510. In an alternative embodiment (not shown), the cover 1550 may be threadedly attached to the base 1510 or may be unthreaded and may mate in an interference fit with the base 1510; in either case, the base flange 1516, the cover-retaining walls 1518, and the cover retaining gaps 1519 may be omitted.

The stopper rests 1520 are arranged such that the stoppers 200 (FIGS. 13-16) are in spaced relation to one another. Each stopper rest 1520 comprises a depression 1522 having a stopper-rest opening 1524 in the upper surface 1512 communicating with a stopper-rest bottom surface 1526, the stopper-rest opening 1524 being shaped so that the minor portion 206 of the stopper 200 passes through the stopper-rest opening 1524, while the major portion 202 of the stopper 200 does not pass through the stopper-rest opening 1524. The stopper-rest opening 1524 also has a vent 1528 communicating between the stopper-cell bottom surface 1526 and a volume 1530 above the upper surface 1512 of the base 1510 for at least sterilization purposes. In addition, the vent 1528 may also allow air/gas to displace from the depression 1522 when a stopper 200 is inserted therein. A column extends upwardly from the stopper-rest bottom surface 1526 and is positioned within the bore 210 (FIGS. 13-16) of the stopper 200 to assist with aligning the stopper in the stopper-rest opening 1524.

Figure 41:
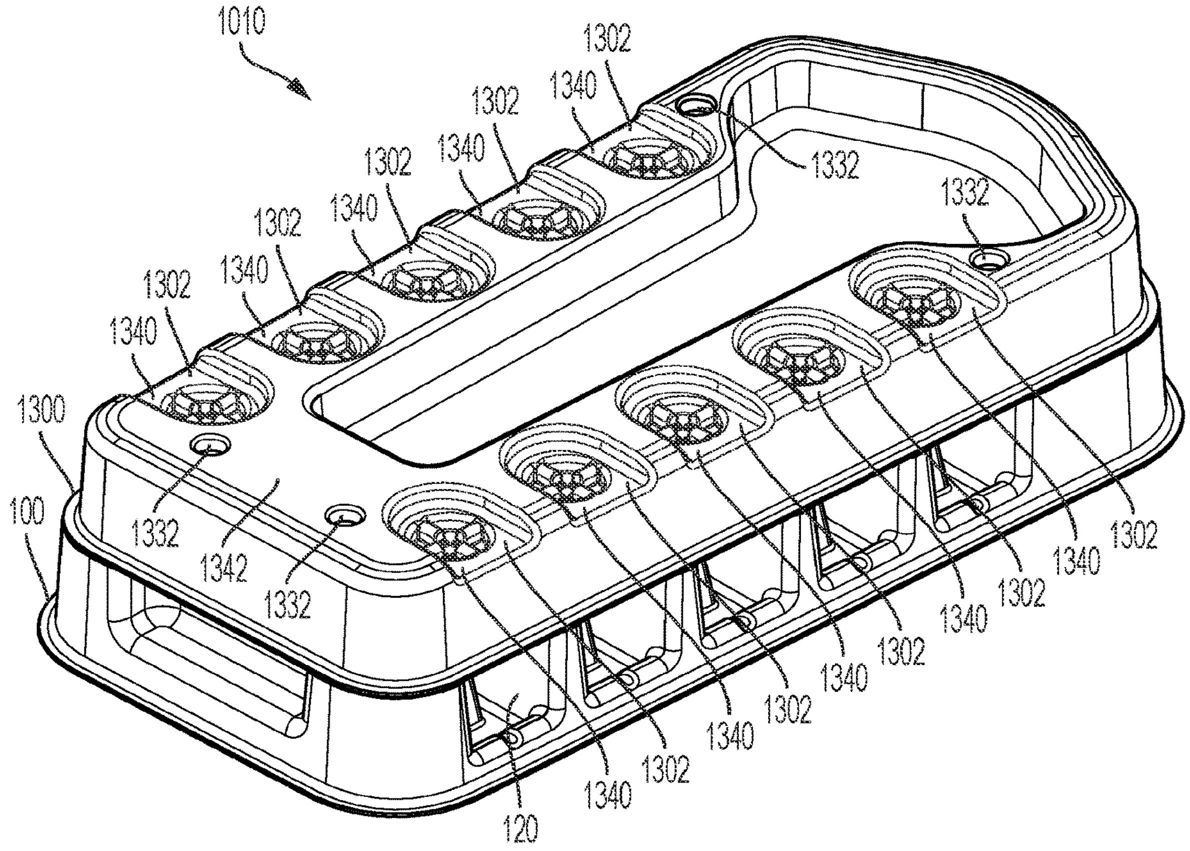
FIG. 41 is a perspective view of a filling system according to the invention.
Figure 42:
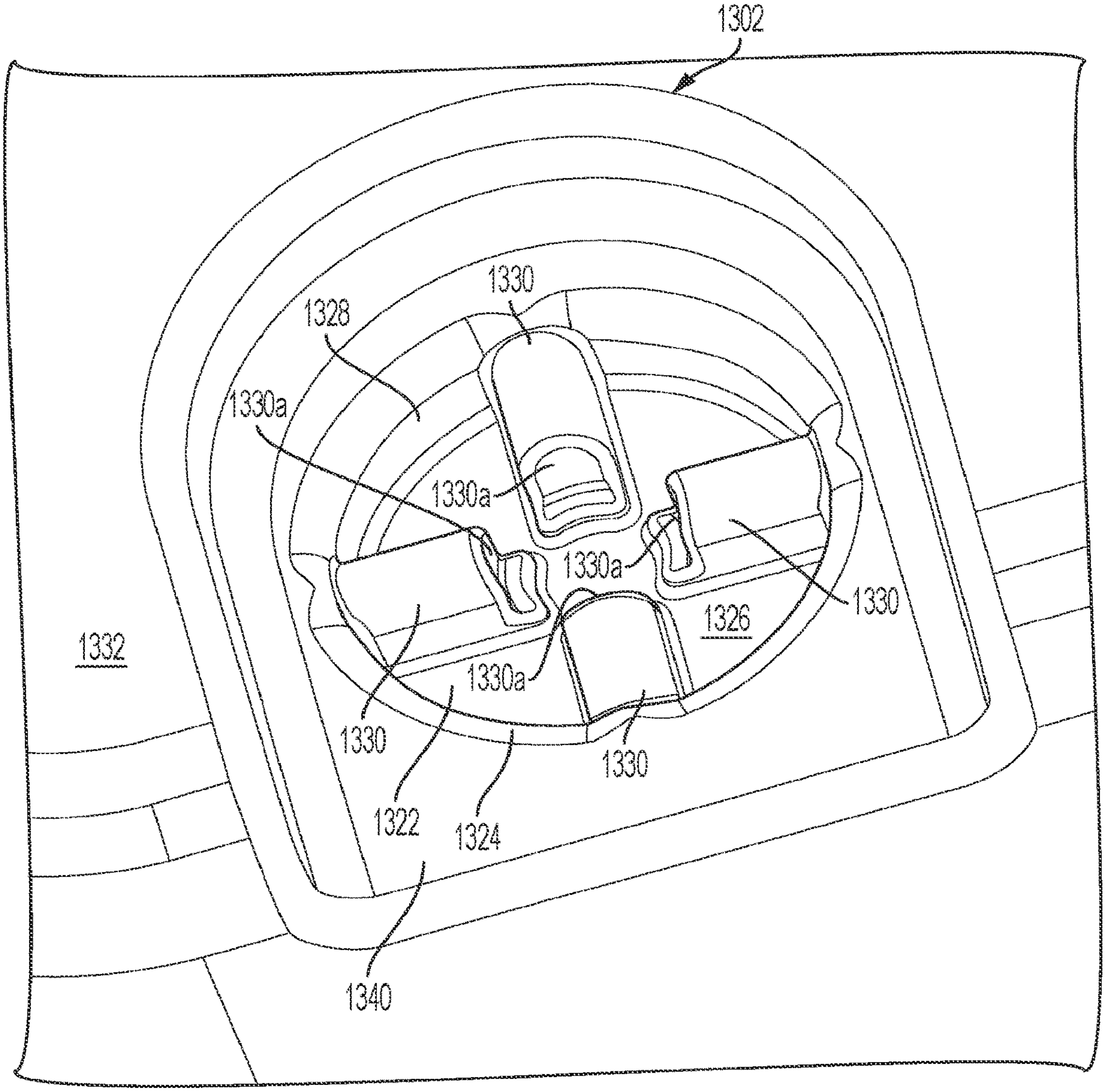
FIG. 42 is a detail perspective view of the filling system of FIG. 41.
Figure 43:
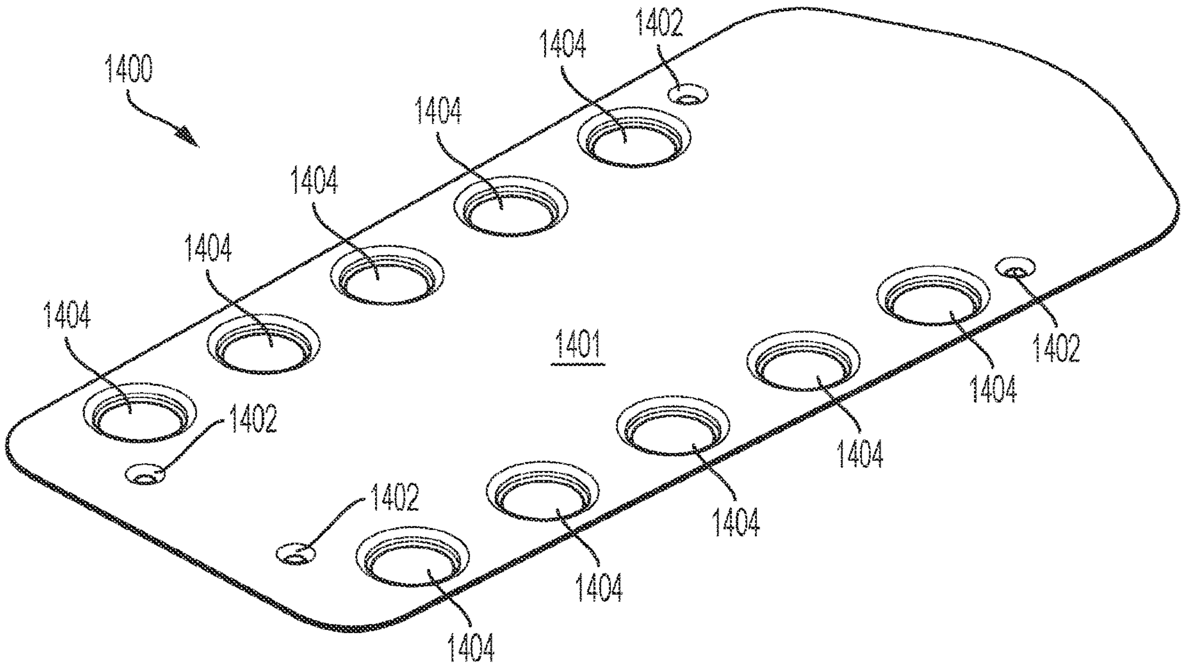
FIG. 43 is a perspective view of a cover for use with the filling system of FIG. 41.

Referring to FIGS. 41-43, an alternative filling system 1010 includes the container tray 100 and a stopper tray 1300 with a cover 1400. The stopper tray 1300 and the cover 1400 are preferably constructed of a molded polymeric material. Arranged on the stopper tray 1300 is at least one stopper carrier 1302, and preferably a plurality of stopper carriers 1302, which conveniently may be placed at regularly spaced intervals. The stopper carriers 1302 preferably correspond in number to and are alignable with the container cells 120 of the container tray 100. In the stopper tray 1300, each stopper carrier 1302 includes a generally cylindrically shaped closed body with a proximal opening 1322, an interior space 1324, a distal inner surface 1326 opposite the proximal opening 1322, and a side wall 1328. The proximal opening 1322 may be disposed within a stopper-carrier notch 1340 in a top surface 1342 of the stopper carrier 1302. The stopper carrier 1302 includes at least one stopper-locating surface, which in the illustrated embodiment comprises four free end surfaces 1330*a* of four stopper-support extensions 1330, which extend radially inwardly from the side wall 1328 and upwardly from the distal inner surface 1326. The free end surfaces 1330*a* may be configured to engage a minor portion 206 of a stopper 200, with a major portion 204 of the stopper 200 supported on the stopper-support bodies 1330. The top surface 1342 of the stopper tray 1300 has downwardly extending bores 1332. The cover 1400 secures to the stopper tray 1300 to secure the stoppers 200 in the stopper tray 1300 during shipment and prior to use. The cover 1400 has an upper surface 1401 and downwardly extending boss features 1402 for engaging and being positioned within the downwardly extending complementary sized bores 1332 of the stopper tray 1300 to secure the cover 1400 to the stopper tray 1300, and downwardly extending stopper-carrier covers 1404, which align with and extend into the stopper carriers 1302 to secure the stoppers 200 to the stopper tray 1300.

Figure 30:
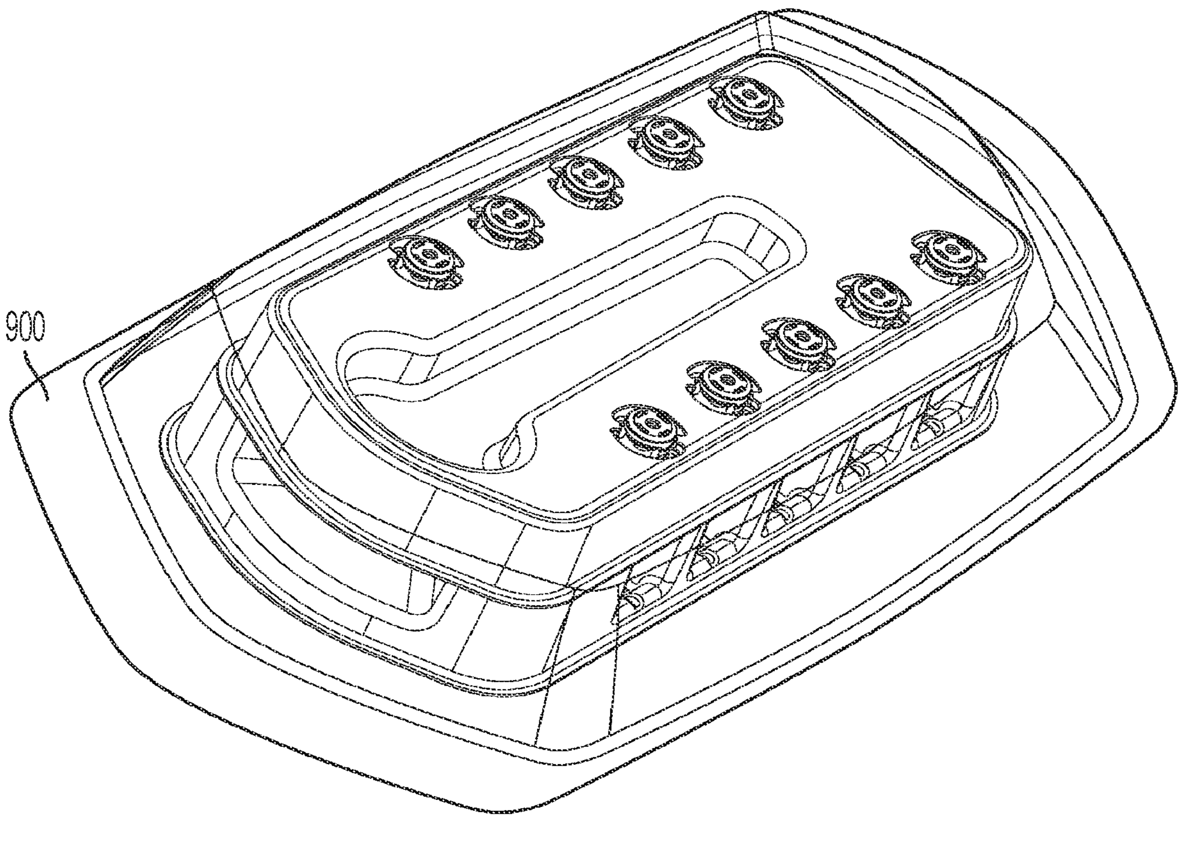
FIG. 30 is a perspective view of a sterilization bag for use in packaging systems disclosed herein.

Referring to FIG. 30, a sterilization bag 900 may be provided containing any or all of the components of any of the packaging systems disclosed herein. The sterilization bag 900 preferably may be a material permeable to a disinfectant (for example, steam) while being impermeable to contaminants. The sterilization bag 900 may be used to sterilize the packaging system after manufacture or before use and may serve as disposable packaging in which the packaging system may be provided to the user.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

In addition, certain terminology is used in the following description for convenience only and is not limiting. The words "lower," "bottom," "upper," "top," "front," "back," and "rear" designate directions in the drawings to which reference is made. The words "inwardly" and "outwardly" refer to directions toward and away from, respectively, the geometric center of the component being discussed, and designated parts thereof, in accordance with the present disclosure. Unless specifically set forth herein, the terms "a," "an," and "the" are not limited to one element, but instead should be read as meaning "at least one." "At least one" may occasionally be used for clarity or readability, but such use does not change the interpretation of "a," "an," and "the." The terminology includes the words noted above, derivatives thereof, and words of similar import Moreover, the singular includes the plural, and vice versa, unless the context clearly indicates otherwise. Various components are described in terms of a single component; however, the illustrated embodiment, or other embodiments not illustrated, may include two or more of the same component, as illustrated in the drawings or noted in the specification, or as otherwise would be understood by a person of skill in the art. Various components are described as being secured against movement or flexing; these references do not contemplate the absolute elimination of all movement or flexing. Instead, these references include restriction or movement of flexing sufficient to alter the functionality of the component or components in operative relation therewith. References to a component extending, moving, or flexing in a particular direction refer to the component extending, moving, or flexing at least partially in the particular direction; an extension, movement, or flexion that includes any component of movement in the particular direction is included.

What is claimed is:

1. A packaging system for sealing a plurality of medicine containers, the packaging system comprising:

a container tray having a plurality of container cells for releasably securing the plurality of medicine containers; and a stopper clip having a plurality of stopper cells for releasable releasably securing a plurality of stoppers, the stopper clip comprising a first hinged-base leg and a second hinged-base leg, and a hinge joining the first hinged-base leg and the second hinged-base leg, wherein:

the hinge is biased to urge the first hinged-base leg and the second hinged-base leg toward one another to a first position, the first hinged-base leg and the second hinged-base leg are configured to move, upon an application of force about the hinge, to a second position in which the first hinged-base leg and the second hinged-base leg are spaced apart to allow insertion of the plurality of stoppers between the first hinged-base leg and the second hinged-base leg, and the first hinged-base leg and the second hinged-base leg are configured to move, upon removal of the force about the hinge, to a third position in which the first hinged-base leg and the second hinged-base leg releasably secure the plurality of stoppers between the first hinged-base leg and the second hinged-base leg.

2. The packaging system of claim 1, wherein:

the first hinged-base leg has a first lever extending therefrom, the second hinged-base leg has a second lever extending therefrom, application of a first compressive force to the first lever and the second lever applies the force about the hinge to move the first hinged-base leg and the second hinged-base leg to the second position, and removal of the first compressive force to the first lever and the second lever causes the first hinged-base leg and the second hinged-base leg to move to the third position.

3. The packaging system of claim 2, wherein:
the first lever has a first interior lever surface facing the second lever and a first exterior lever surface facing opposite the first interior lever surface,
the second lever has a second interior lever surface facing the first lever and a second exterior lever surface facing opposite the second interior lever surface, and
the first compressive force is applied to the first exterior lever surface and the second exterior lever surface.

4. The packaging system of claim 1, wherein the hinge is a living hinge disposed between the first hinged-base leg and the second hinged-base leg.

5. The packaging system of claim 1, wherein:
the first hinged-base leg has a first pushing surface configured to contact a proximal surface of each stopper when each stopper is releasably secured between the first hinged-base leg and the second hinged-base leg in the third position, the second hinged-base leg has a second pushing surface configured to contact the proximal surface of each stopper when each stopper is releasably secured between the first hinged-base leg and the second hinged-base leg in the third position,
the first hinged-base leg has a first retention arm projecting toward the second hinged-base leg,
the second hinged-base leg has a second retention arm projecting toward the first hinged-base leg,
the first retention arm and the second retention arm are aligned to create a retention gap therebetween, and
the first retention arm and the second retention arm together are configured to prevent distal movement of the stopper when the stopper is releasably secured between the first hinged-base leg and the second hinged-base leg in the third position.

6. The packaging system of claim 1, wherein at least two of the plurality of stopper cells are configured to align with at least two of the plurality of container cells.

7. A packaging system for sealing a medicine container, the packaging system comprising:
a container tray having a container cell for releasably securing the medicine container; and
a stopper clip having a stopper cell for releasably securing a stopper, the stopper clip comprising a first hinged-base leg, a second hinged-base leg, and a hinge joining the first hinged-base leg and the second hinged-base leg, wherein:
the hinge is biased to urge the first hinged-base leg and the second hinged-base leg toward one another,
the first hinged-base leg has a first pushing surface configured to contact a proximal surface of the stopper when the stopper is releasably secured in the stopper cell,
the second hinged-base leg has a second pushing surface configured to contact the proximal surface of the stopper when the stopper is releasably secured in the stopper cell,
the first hinged-base leg has a first radially extending retention arm that is distal of the first pushing surface,
the second hinged-base leg has a second radially extending retention arm that is distal of the second pushing surface, and
the first radially extending retention arm and the second radially extending retention arm together are configured to prevent distal movement of the stopper when the stopper is releasably secured in the stopper cell.

8. The packaging system of claim 7, wherein the first radially extending retention arm and the second radially extending retention arm are aligned to create a retention gap therebetween when the stopper is releasably secured in the stopper cell.

9. The packaging system of claim 7, wherein:
the first hinged-base leg and the second hinged-base leg are biased towards a first position,
the first hinged-base leg and the second hinged-base leg are configured to move, upon an application of force about the hinge, to a second position wherein the first hinged-base leg and the second hinged-base leg are spaced apart to allow insertion of the stopper between the first hinged-base leg and the second hinged-base leg, and
the first hinged-base leg and the second hinged-base leg are configured to move, upon removal of the force about the hinge, to a third position in which the first hinged-base leg and the second hinged-base leg releasably secure the stopper between the first hinged-base leg and the second hinged-base leg.

10. The packaging system of claim 9, wherein:
the first hinged-base leg has a first lever extending therefrom,
the second hinged-base leg has a second lever extending therefrom,
the first lever and the second lever are spaced from one another such that, upon application of a first compressive force to the first lever and the second lever, the first hinged-base leg and the second hinged-base leg are configured to move to the second position, and
upon removal of the first compressive force to the first lever and the second lever, the first hinged-base leg and the second hinged-base leg are configured to move to the third position.

11. The packaging system of claim 10, wherein:
the first lever has a first interior lever surface facing the second lever and a first exterior lever surface facing opposite the first interior lever surface,
the second lever has a second interior lever surface facing the first lever and a second exterior lever surface facing opposite the second interior lever surface, and
the first compressive force is applied to first exterior lever surface and the second exterior lever surface.

12. The packaging system of claim 7, wherein the hinge is a living hinge disposed between the first hinged-base leg and the second hinged-base leg.

13. The packaging system of claim 7, wherein the stopper cell is configured to align with the container cell.

14. The packaging system of claim 7, wherein:
the container tray has a plurality of container cells for releasably securing a plurality of medicine containers, and
the stopper clip has a plurality of stopper cells for releasably securing a plurality of stoppers.

15. A packaging system for sealing a plurality of medicine containers, the packaging system comprising:
a container tray having a plurality of container cells for releasably securing the plurality of medicine containers; and
a stopper clip having a plurality of stopper cells for releasably securing a plurality of stoppers, the stopper clip comprising a first hinged-base leg, a second hinged-base leg, and a hinge joining the first hinged-base leg and the second hinged-base leg, wherein:

the first hinged-base leg has a first lever extending therefrom, the second hinged-base leg has a second lever extending therefrom, the hinge is biased to urge the first hinged-base leg and the second hinged-base leg toward one another to a first position, the first lever and the second lever are spaced from one another such that, upon application of a first compressive force to the first lever and the second lever to apply force about the hinge, the first hinged-base leg and the second hinged-base leg are configured to move to a second position in which the first hinged-base leg and the second hinged-base leg are spaced apart to allow insertion of the plurality of stoppers between the first hinged-base leg and the second hinged-base leg, and upon removal of the first compressive force to the first lever and the second lever, the first hinged-base leg and the second hinged-base leg are configured to move to a third position in which the first hinged-base leg and the second hinged-base leg releasably secure the plurality of stoppers between the first hinged-base leg and the second hinged-base leg.

16. The packaging system of claim 15, wherein:

the first lever has a first interior lever surface facing the second lever and a first exterior lever surface facing opposite the first interior lever surface, the second lever has a second interior lever surface facing the first lever and a second exterior lever surface facing opposite the second interior lever surface, and the first compressive force is applied to first exterior lever surface and the second exterior lever surface.

17. The packaging system of claim 15, wherein the hinge is a living hinge disposed between the first hinged-base leg and the second hinged-base leg.

18. The packaging system of claim 15, wherein the plurality of stopper cells are configured to align with the plurality of container cells.

19. The packaging system of claim 15, wherein:

the first hinged-base leg has a first retention arm projecting toward the second hinged-base leg, the second hinged-base leg has a second retention arm projecting toward the first hinged-base leg, and the first retention arm and the second retention arm together are configured to prevent distal movement of the plurality of stoppers when the plurality of stoppers are releasably secured between the first hinged-base leg and the second hinged-base leg in the third position.

* * * * *